US011727891B2

(12) United States Patent
Shi et al.

(10) Patent No.: US 11,727,891 B2
(45) Date of Patent: Aug. 15, 2023

(54) INTEGRATED ELECTRONIC AND PHOTONIC BACKPLANE ARCHITECTURE FOR DISPLAY PANELS

(71) Applicant: META PLATFORMS TECHNOLOGIES, LLC, Menlo Park, CA (US)

(72) Inventors: Zhimin Shi, Bellevue, WA (US); James Ronald Bonar, Redmond, WA (US); Fenglin Peng, Redmond, WA (US); Ying Geng, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 55 days.

(21) Appl. No.: 17/528,036

(22) Filed: Nov. 16, 2021

(65) Prior Publication Data

US 2023/0154424 A1 May 18, 2023

(51) Int. Cl.
*G09G 3/36* (2006.01)
*G09G 3/34* (2006.01)
*F21V 8/00* (2006.01)
*G02F 1/1335* (2006.01)

(52) U.S. Cl.
CPC .......... *G09G 3/3473* (2013.01); *G02B 6/005* (2013.01); *G09G 3/3406* (2013.01); *G09G 3/36* (2013.01); *G02F 1/133512* (2013.01); *G09G 2300/0426* (2013.01); *G09G 2320/0209* (2013.01)

(58) Field of Classification Search
CPC ...... G09G 3/3406; G09G 3/3473; G09G 3/36; G09G 2300/0426; G09G 2320/0209; G02B 6/005; G02F 1/133512
See application file for complete search history.

(56) References Cited

U.S. PATENT DOCUMENTS

| | | | |
|---|---|---|---|
| 6,693,736 B1 | 2/2004 | Yoshimura et al. | |
| 2011/0255303 A1* | 10/2011 | Nichol ................. | G02B 6/0053 362/606 |
| 2017/0276999 A1 | 9/2017 | Yoon et al. | |
| 2018/0095283 A1* | 4/2018 | Takeda ................... | G02B 6/005 |
| 2019/0227315 A1* | 7/2019 | Sun ....................... | G02B 26/105 |
| 2021/0120680 A1 | 4/2021 | Pun et al. | |

OTHER PUBLICATIONS

International Search Report and Written Opinion for International Application No. PCT/US2022/049629, dated Mar. 16, 2023, 7 pages.

* cited by examiner

*Primary Examiner* — Sanghyuk Park
(74) *Attorney, Agent, or Firm* — Artegis Law Group, LLP

(57) ABSTRACT

In various embodiments, an apparatus comprises a composite backplane that modulates light from a light source, where the composite backplane comprises an electronics layer disposed on a substrate, a photonics integrated circuit (IC) layer disposed on the electronics layer that causes light from the light source to propagate in a first direction, and an active light modulation (ALM) interface layer disposed on the photonics IC layer controls an ALM interface layer in order to control the light propagating in the first direction.

20 Claims, 14 Drawing Sheets

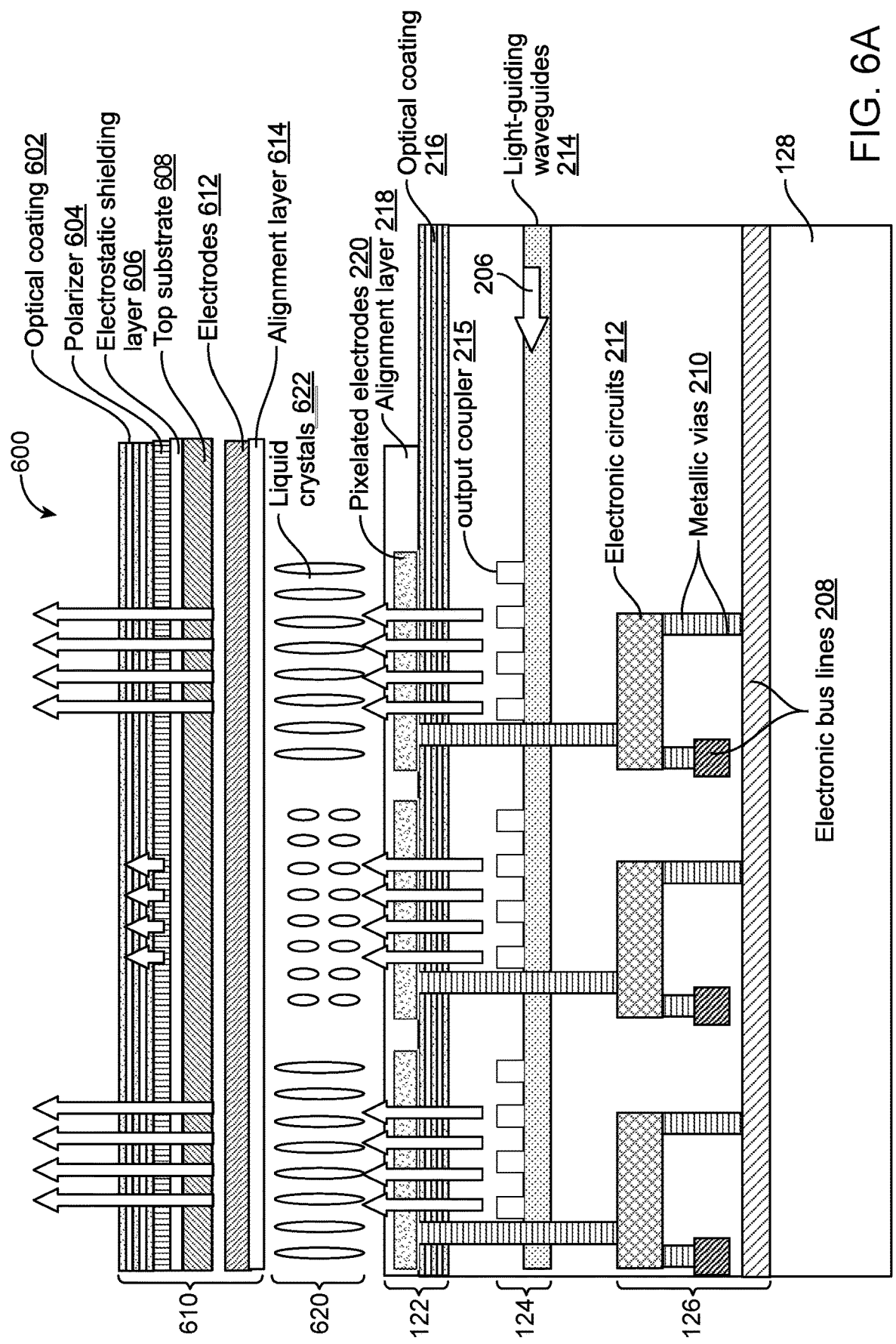

Top view 3D view

INTEGRATED ELECTRONIC AND PHOTONIC BACKPLANE ARCHITECTURE FOR DISPLAY PANELS

BACKGROUND

Field of the Various Embodiments

Embodiments of the present disclosure relates generally to video displays, head-mounted displays and, more specifically, to an integrated electronics and photonic backplane architecture for display panels.

Description of the Related Art

A display assembly, included in optical assemblies such as head-mounted displays, mobile displays, and so forth, operates by using pixels to control light wavelengths that propagate to a lens. The lens concentrates light wavelengths provided by the display assembly to reach the eye of the user as an image. For example, a virtual reality display assembly includes a thin-film transistor (TFT) liquid crystal display (LCD) panel disposed on a backlight unit (BLU) that acts as a light source for the TFT LCD panel.

In some examples, each of the LCD panel and the backlight unit is packaged with a cover glass. When the LCD panel is disposed on the cover glass of the backlight unit, the cover glass over the backlight unit creates a large distance between the backlight unit and the LCD panel. At least one drawback of conventional display assemblies is that, when the light source, such as a laser source or a light-emitting diode (LED) array, is randomly scattered by the backlight unit, the directionality of the light scattered by the backlight unit becomes large and uncontrollable. This leads to a low photon efficiency and limited fill factor for the amount of light that the display panel provides. Further, the large distances between layers result in bulky designs that limit how such display assemblies can be included in compact optical assemblies.

Some display assemblies include a photonic integrated circuit (PIC)-based backlight unit in order to precisely control the emission cone of a given light source on a pixel-by-pixel basis, improving the photon efficiency of the backlight unit. However, such display assemblies require post-fabrication alignment at a high precision, which is costly and time-consuming. These PIC-based backlight units also include cover glass over the LCD panel and backlight unit, which similarly cause the assembly to be bulky. Moreover, the distance between the PIC-based backlight unit and the LCD panel causes a large amount of crosstalk between neighboring pixels.

SUMMARY

In various embodiments, an apparatus comprises a composite backplane that modulates light from a light source, the composite backplane comprising an electronics layer disposed on a substrate, a photonics integrated circuit (IC) layer disposed on the electronics layer that causes light from the light source to propagate in a first direction, and an active light modulation (ALM) interface layer disposed on the photonics IC layer controls an active medium layer in order to control the light propagating in the first direction.

Other embodiments include a display system comprising a display panel comprising a composite backplane, including an electronics layer disposed on a substrate, a photonics integrated circuit (IC) layer disposed on the electronics layer that directs light from a light source to propagate in a first direction, and an active light modulation (ALM) interface layer disposed the photonics IC layer, an active medium layer disposed on the ALM interface layer comprising sets of pixels including sets of an active media, and a top cover layer, and a controller causing the display panel to modify the light controlled via the active medium layer or the photonic IC layer.

At least one technical advantage of the disclosed embodiments relative to the prior art is that that composite backplane comprising a photonic integrated circuit layer disposed between an electronic IC and a liquid crystal interface layer enables the composite backplane to possess a compact composition that support various types of light sources (e.g., lasers, light-emitting diodes, etc.) and provides high efficiency and high pixel density. Further, the composite backplane can be fabricated using various lithographic fabrication processes and can be included in a wide range of display assemblies.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIGS. 6A-6C illustrates views of various configurations for a liquid crystal cell 600 including the composite backplane of FIG. 2, according to various embodiments of the present disclosure.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Overview

As described above, one problem with conventional approaches for display panels is that the composition of layers needed to provide a quality image causes various wavelengths of light to be blocked or propagate in directions other than towards the lens of a display assembly, resulting in large losses in efficiency associated with providing light, such as low pixel efficiency and a low fill factor. Further, various techniques to raise the efficiency of the display panel cause the fabrication process to become more complex. For example, the process may require specialized fabrication and calibration equipment in order to properly align pixels in a given display panel, significantly increasing the cost and complexity associated with including the display panel as a component in display assemblies.

Accordingly, in various embodiments disclosed herein, a die fabrication system produces a composite backplane that includes a specific set of layers to control light provided from a light source. The die fabrication system disposes a set of layers in sequence to produce a composite backplane for a liquid crystal unit in order to drive a display panel that is compact, highly-efficient, and possesses a high pixel density. The composite backplane includes an electronic IC layer, a photonic integrated circuit (PIC) layer, and an active light modulation (ALM) interface layer over a substrate that directs light to a set of pixels in a separate active medium layer.

The composite backplane can be included in both front-lit display panels and back-lit display panels and can support various light sources (e.g., lasers, light-emitting diodes, etc.) and provides a high color gamut. Further, the composite backplane can be fabricated using various lithographic fabrication processes to produce a compact composition that can be included in a wide range of display assemblies. Such assemblies can be used in systems that control the light provided via amplitude modulation (e.g., two-dimensional display panels) or via phase modulation (e.g., coherent holographic display panels).

System Overview

Figure 1:
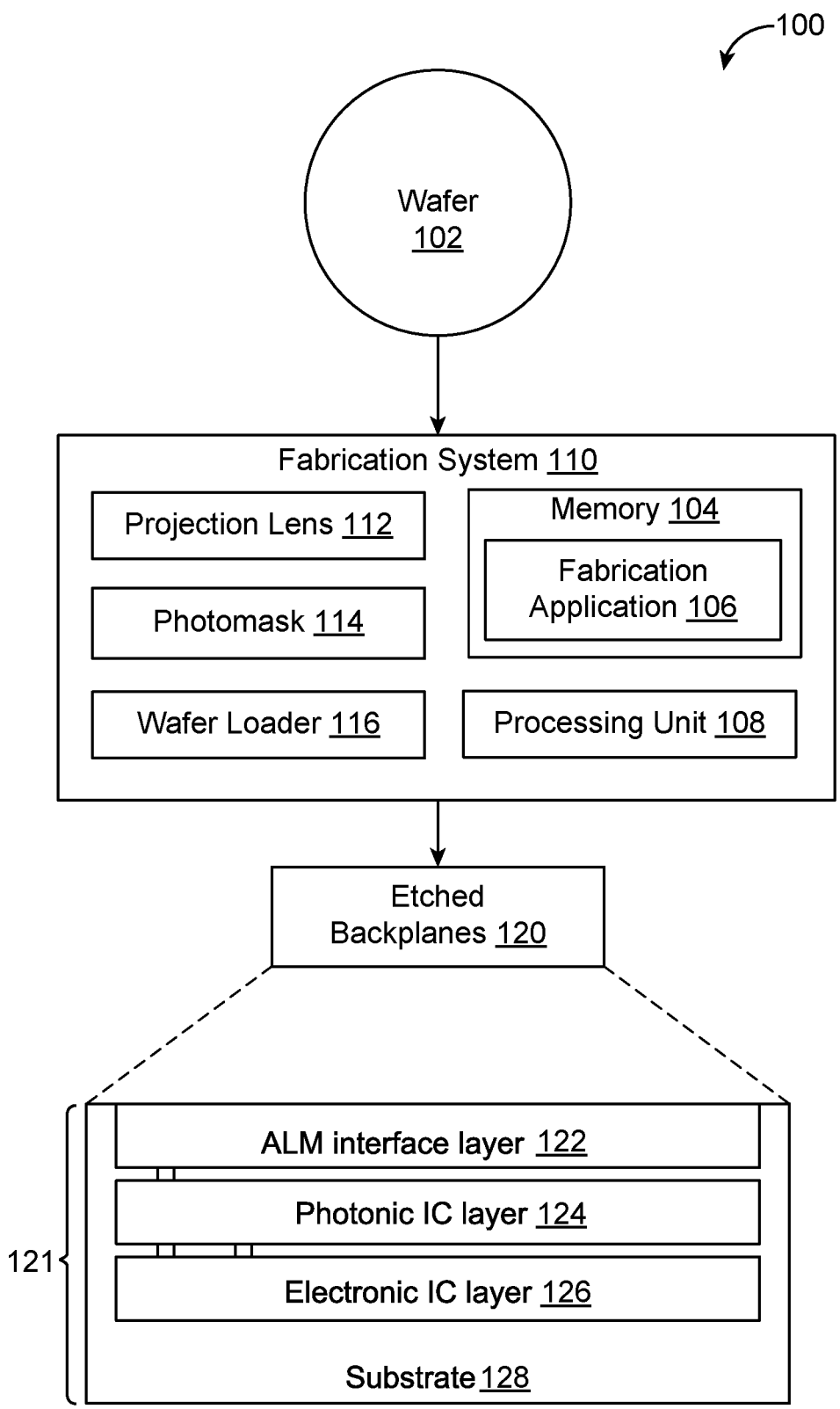
FIG. 1 illustrates a die fabrication system configured to implement one or more aspects of the present disclosure.

FIG. 1 illustrates a die fabrication system 100 configured to implement one or more aspects of the present disclosure. As shown, die fabrication system 100 includes a wafer 102, a fabrication system 110, and etched backplanes 120. The fabrication system 110 includes a projection lens 112, a photomask 114, and a wafer loader 116. The etched backplane 120 includes composite backplane 121 that includes an active light modulation (ALM) interface layer 122, a photonic integrated circuit (IC) layer 124, an electronic IC layer 126, and a substrate 128.

In operation, the fabrication system 110 causes the wafer loader 116 to manipulate the wafer 102 via moving, rotating, slicing, etc. The fabrication system 110 also causes the projection lens 112 and photomask 114 to pattern portions of the wafer 102 to generate the etched backplane 120. In various embodiments, the fabrication system 110 uses various lithography-based nano-manufacturing processes associated with fabricating electronic components and/or photonic components in order to pattern the etched backplanes 120 on the wafer 102. In some embodiments, the fabrication system 110 separates the etched backplanes 120 into separate die packages, where each die package includes a composite backplane 121. In such instances, the respective composite backplanes may be combined with other layers and/or components to fabricate display assemblies, such as a display panel, a device containing a display panel (e.g., a mobile phone, tablet, wearable near-eye display, etc.), and so forth.

Upon fabrication, a display panel including the composite backplane 121 may be thinner than other display panels due to reduced gaps between respective layers of the composite backplane 121. For example, a gap between the ALM interface layer 122 and the photonic IC layer 124 may be reduced compared to other techniques, as the composite backplane 121 does not include a cover glass over the photonics IC layer 124. Further, the thickness of the composite backplane 121 could be reduced by including electronic modules for controlling the respective ALM interface layer 122 and the photonics IC layer 124 in the electronic IC 126. In such instances, a composite backplane 121 having a composition that includes the ALM interface layer 122, the photonics IC layer 124 and the electronic IC 126 in this manner enables the composite backplane 121 to provide a better fill factor, defined as a ratio of the light emitting area of each pixel to the surface area occupied by the pixel, for the display panel.

The wafer 102 may be a semiconducting material, such as silicon, that is used to fabricate an IC die package. In various embodiments, the fabrication system 110 may perform various techniques on the wafer 102 in order to generate the etched backplanes 120. For example, the fabrication system 110 could perform wafer-level packaging (WLP) techniques to pattern and dice the wafer 102 in order to produce the IC die packages. In some embodiments, the fabrication system 110 could perform panel-level packaging techniques to generate a panel-sized composite backplane 121 to drive a display panel of a specified size. Additionally or alternatively, in some embodiments, the fabrication system 110 may perform other techniques (e.g., flip chip packaging, quilt packaging, etc.) to prepare the etched backplanes 120.

The fabrication system 110 includes one or more devices that pattern and/or slice portions of the wafer 102 in order to generate the etched backplanes 120. For example, the fabrication system 110 could include one or more devices, such as one or more wafer loaders 116 (e.g., 116a, 116b, etc.), photomasks 114 (e.g., 114a, 114b, etc.), projection lenses 112 (e.g., 112a, 112b, etc.) and/or other devices (e.g., grinders, coaters, developers, etchers, strippers, etc.) that perform various processes to pattern the surface of the wafer 102. For example, the fabrication system 110 could use the projection lens 112 and the photomask 114 in conjunction to form a given layer of the etched backplanes 120. In such instances, the fabrication system 110 could use different projection lenses 112 and/or photomasks 114 to form the different layers included in the composite backplane 121. In some embodiments, the fabrication system 110 could also include devices that perform various functions to form layers on the wafer 102. In such instances, the fabrication system 110 could perform a technique, such as chemical mechanical planarization (CMP), that adds layers that form a given substrate and/or layer on the surface of the wafer 102. In some embodiments, one or more devices included in the fabrication system 110 may perform other processes in the fabrication process. For example, the wafer loader 116 could grind and polish a surface of the wafer 102 before proceeding to add a given layer onto the wafer 102.

The processing unit 108 includes one or more processors that control the operation of the fabrication system 110. In various embodiments, the processing unit 108 may be one or more central processing units (CPUs), multi-core processors, microprocessors, microcontrollers, digital signal processors, field-programmable gate arrays (FPGAs), application-specific integrated circuits (ASICs), and/or the like. In some embodiments, the processing unit 108 may be included as part of an operator workstation and/or operated separately from, but in coordination with, the operator workstation. The memory 104 may be used to store software executed by the processing unit 108. The memory 104 may also store one or more data structures used during the operation of the fabrication system 110. The memory 104 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

The processing unit 108 executes the fabrication application 106 to produce etched backplanes 120 via control of one or more devices in the fabrication system 110 (e.g., the projection lens 112, the photomask 114, the wafer loader 116, etc.). In various embodiments, the fabrication application 106 may receive inputs specifying configurations for each of the layers 122-126 included in the composite backplane 121. The fabrication application 106 may cause the one or more devices in the fabrication system 110 to pattern layers onto the wafer 102 in order to produce the etched backplanes 120. For example, the fabrication application 106 could receive a device design as an input that specifies the configuration of components in each of the layers 122-126. In such instances, the processing unit 108 could execute the fabrication application 106 to control the fabrication system 110 when patterning successive layers of the etched backplanes 120.

In some embodiments, the fabrication application 106 may optimize the configuration of one or more layers 122-126 based on a target configuration. For example, an operator could identify one or more separate characteristics (e.g., light source type, light source position, modulation type, etc.) of a device that will include the composite backplane 121. In such instances, the fabrication application 106 could determine the components to include in each respective layer 122-126 and position components within each layer 122-126 in an arrangement that enables the composite backplane 121 to possess the characteristics specified in the target configuration.

The etched backplanes 120 include one or more portions of a composite backplane 121 that are used to drive the operation of a display panel. In some embodiments, the etched backplanes 121 are a patterned and etched version of the wafer 102 and include backplanes for multiple packages (e.g., multiple display panels). In some embodiments, the fabrication system 110 may slice the wafer into separate panels, where the etched backplanes 120 include a set of separate composite backplanes 121.

A composite backplane 121 is a version of a display device backplane that provides structural support for a display panel. As shown, the composite backplane 121 includes a composition of layers that combine to drive and control light provided by a light source and modulated by a set of liquid crystals in a separate layer. For example, a display panel including a layer of liquid crystals (not shown) and the composite backplane 121 may use one or more electrodes included in the ALM interface layer 122 to control the orientation of subsets of liquid crystals in order to control the polarity of light rays passing through the liquid crystal layer.

For example, the composite backplane 121 could compose three layers that are fabricated in sequence using standard lithographic manufacturing processes. In this example, the layers include the ALM interface layer 122 that includes a set of pixelated conducting pads (e.g., electrodes) for liquid crystal cells; the ALM interface layer 122 could also include a black matrix layer, a reflection control coating (e.g., anti-reflection coating, partial-reflection coating, high-reflection coating, etc.). The layers also include the photonic IC layer 124 that includes light-guiding waveguides and out-coupling components in single-layer or multi-layer configurations. The layers can also include the electronic IC layer 126 that includes electronic bus lines for power, control & data, as well as integrated electronic circuitry for components in the ALM interface layer 122 and the photonic IC layer 124. In some embodiments, one or more vertical metallic via paths ("vias") are used to connect the electronic IC layer 126 with the ALM interface layer 122 and the photonic IC layer 124, respectively.

Figure 2:
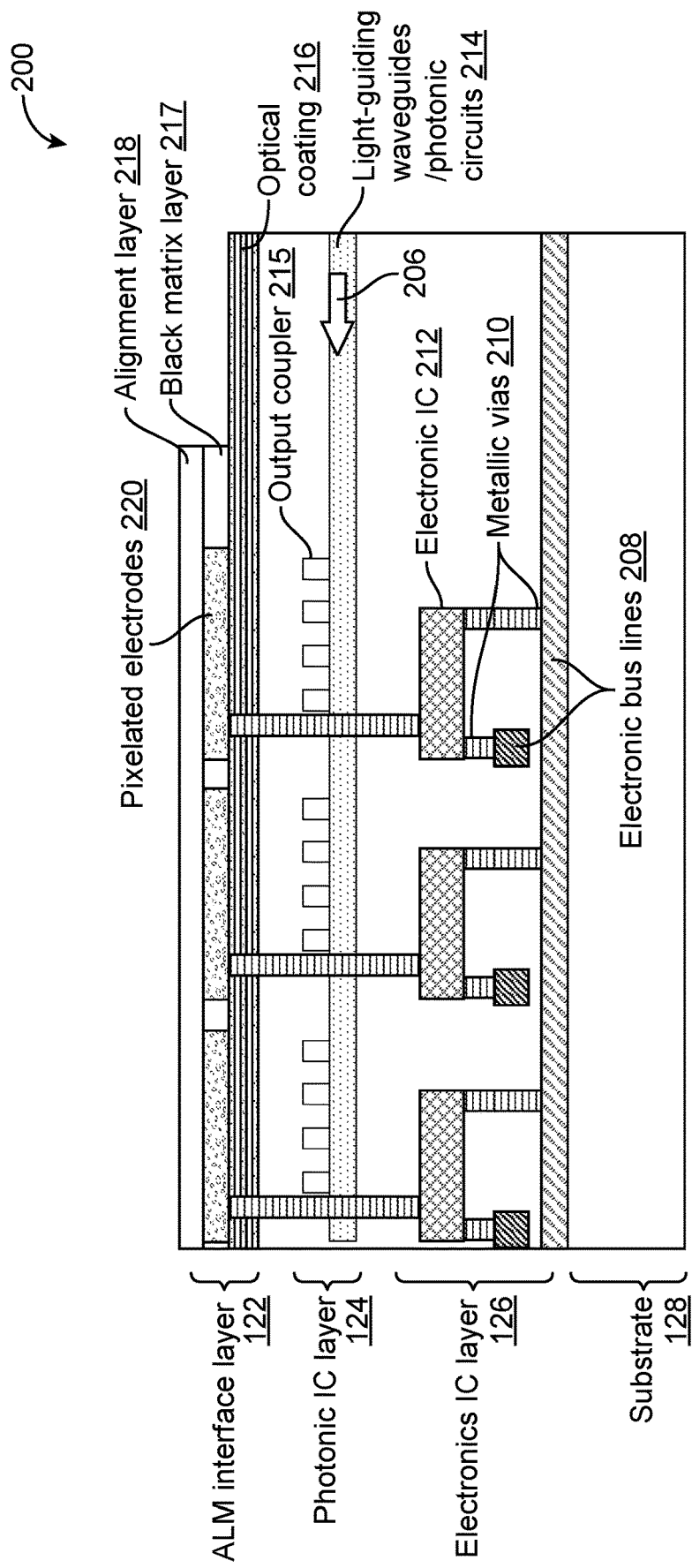
FIG. 2 illustrates a view of a composite backplane processed by the device fabrication system of FIG. 1, according to various embodiments of the present disclosure.

FIG. 2 illustrates a view of a composite backplane 200 processed by the device fabrication system 100 of FIG. 1, according to various embodiments of the present disclosure. As shown, the composite backplane 200 includes the ALM interface layer 122, the photonic IC layer 124, the electronic IC layer 126, and the substrate 128. The ALM interface layer 122 includes pixelated electrodes 220, a black matrix layer 217, and an alignment layer 218. The photonic IC layer includes light-guiding waveguides 214 and output couplers 215. The electronic IC layer 126 includes electronic ICs 212, metallic vias 210, and electronic bus lines 208.

As shown, the composite backplane 200 controls the light generated by a light source. In particular, the composite backplane 200 controls both an active media, such as liquid crystals (not shown), via the pixelated electrodes 220 included in the ALM interface layer 122 and the light-guiding waveguides ("photonic circuits") 214, output couplers 215, and other light modulating and out-coupling components. In particular, the light-guiding waveguides 214 control the light 206 provided by a light source, such as a side light source or other light source (e.g., front-lit light source, back-light lit source) that provides the light to the photonic IC layer. In addition, the pixelated electrodes in the ALM interface layer 122 control sets of active media in a separate active medium layer that modify the polarization of the light provided by the light source.

Controlling the light propagating from the light source through multiple components increases the light efficiency (e.g., photon efficiency, pixel density, etc.) due to reductions in optical crosstalk between neighboring pixels and greater control of emission cones for the light. The composite backplane 200 provides benefits associated with both reflective designs that modulate front-lit light sources and transmissive designs that modulate back-lit light sources. Further, the configuration of the composite backplane 121 increases the fill factor due to reductions in components between layers, such as moving most electronic components to a separate electronic IC 126 and connecting the electronic components with other components using metallic via paths 210.

In some embodiments, the composite backplane 200 may operate in conjunction with a front-lit light source, such as a liquid crystal on silicon (LCOS) layer disposed on the composite backplane 120. In such instances, a display panel including the LCOS layer and the composite backplane may act as a spatial light modulator and may include additional components in the layers 122-126 in order to separate the incident and reflected light paths of light generated by the light source in the LCOS layer. In other embodiments, the composite backplane 200 may operate in conjunction with a back-lit light source and act as a spatial light modulator for a transmissive liquid crystal layer.

In various embodiments, the composite backplane 200 may be integrated with other devices or components. For example, the composite backplane 200 could be integrated with one or more on-chip light sources, such as laser sources, superluminescent light-emitting diode (SLED) sources and/or light-emitting diode (LED) arrays. In such cases, the device may act as a stand-alone display module that modulates light produced by the on-chip light sources. In various embodiments, the light source can be any type of LED (e.g., LED, µLED, organic light-emitting diode (OLED), quantum-dot light-emitting diode (QDLED), perovskite light-emitting diode (PeLED), etc.). In some embodiments, the light source can be one or more lasers, such as diode lasers, vertical cavity surface emission lasers, heterogeneously-integrated lasers, hybrid lasers, fiber lasers, and so forth. In some embodiments, the light source may be a nonlinear light source from one or more other light sources, such as a pump laser field, a sum-frequency generation source, second-harmonic generation source, a four-wave-mixing source, a difference-frequency generation source, a parametric down-conversion source, and so forth.

Additionally or alternatively, the composite backplane 200 may be integrated with additional integrated circuit modules in order to enable more power-efficient data processing and transferring of data between the processor and the light modulating components in the layers 122-124.

Variations for the Composite Backplane Architecture

Figure 3:
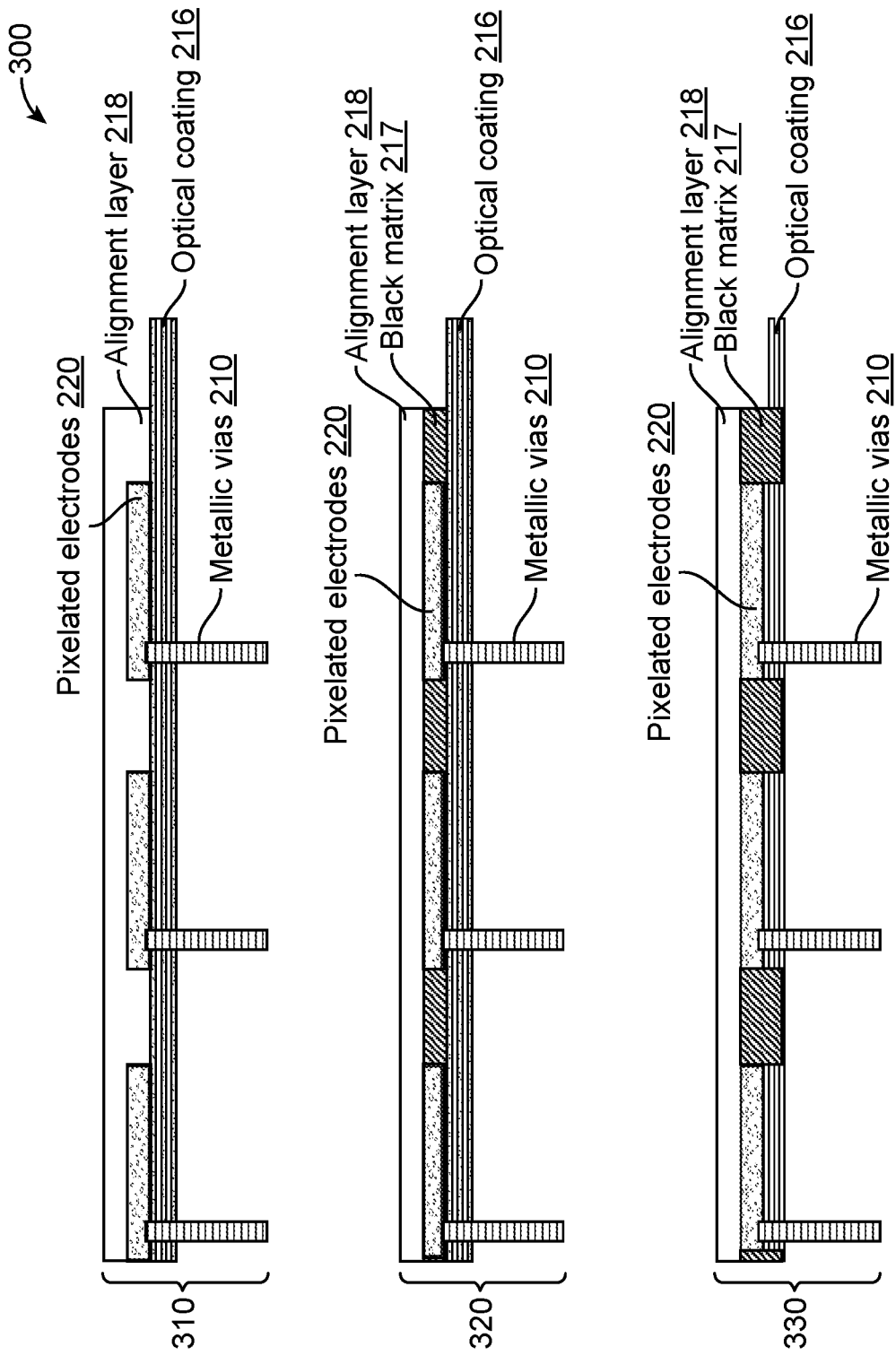
FIG. 3 illustrates views of various configurations for a liquid crystal interface layer included in a composite backplane of FIG. 2, according to various embodiments of the present disclosure

FIG. 3 illustrates views of various configurations for a liquid crystal interface layer included in a composite backplane 200 of FIG. 2, according to various embodiments of the present disclosure. As shown, a set of candidate ALM interface layers 300 include candidate ALM interface layer configurations 310-330.

As shown, each configuration 310-330 of the ALM interface layer 122 can be combined independently with other configurations for the respective photonics IC layer 124 and/or the electronic IC 126. In various embodiments, each of the candidate ALM interface layers 300 may act as an active pixel interface layer that includes components to control one or more ALM pixel cells for a given active medium (e.g., a set of liquid crystals in an active media layer that control light for one pixel). The ALM interface layer 300 may also include different types of optical coating (e.g., AR or PR coating 216), alignment layers to position the electrodes, and/or black matrix layers that block extraneous light between pixels.

For example, configuration 310 could include a set of pixelated electrodes 220 to control separate active media pixel cells (not shown). In such instances, the pixelated electrodes can provide individual electronic control signals to separate pixel cells. The configuration 310 may include an anti-reflective (AR) coating 216 for single-pass operation of the pixel cells, or partial-reflective (PR) coating 216 for resonance-mode operation of the pixel cells.

In various embodiments, the candidate ALM interface layers 300 may include an alignment layer 218. In some embodiments, the structure of the alignment layer 218 may be based on a micro-structured surface that can be lithographically fabricated, or the structure may be based on materials that can be spun on top of the device. In some embodiments, the alignment layer 218 fills gaps between components in the layer. For example, configuration 310 illustrates the alignment layer occupying spaces between the pixelated electrodes 220.

In some embodiments, the candidate ALM interface layers 300 may include black matrix layers 217. The black matrix layer 217 may be located at various vertical positions within the ALM interface layer 122 and/or the photonics IC layer 124. For example, the black matrix layer 217 could be positioned in spaces between the pixelated electrodes 220 and may be made of a reflective metallic material. When the black matrix layer 217 is fabricated with the other components in the ALM interface layer 300, the black matrix layer 217 is positioned correctly and no post-fabrication alignment is necessary. In some embodiments, the black matrix layer may reduce crosstalk between pixel cells by blocking or reflecting light that would otherwise propagate through the ALM interface layer 300. In such instances, the black matrix layer 217 reduces the amount of light seen in order to restrict further refraction. In some embodiments, the configuration of the black matrix layer 217 may differ. For example, configuration 320 includes a black matrix layer 217 that includes a thin black matrix film below each electrode 220 and thicker sections between each electrode 220. In configuration 330, the black matrix layer 217 is also included in the optical coating layer 216.

In various embodiments, a particular configuration 310-330 may be selected based on a set of design, fabrication, and/or operating characteristics. For example, a designer could select specific materials and fabrication processes for the ALM interface layer 300 in order to be compatible with the fabrication of the photonic IC layer 124 and/or the electronic IC layer 126 (e.g., maximum processing temperature, material compatibility, etc.). In another example, a designer may specify the configuration of the electrodes and/or the black matrix layer in order to control a greater number of pixels or to suppress optical inefficiencies like scattering and crosstalk.

Figure 4A:
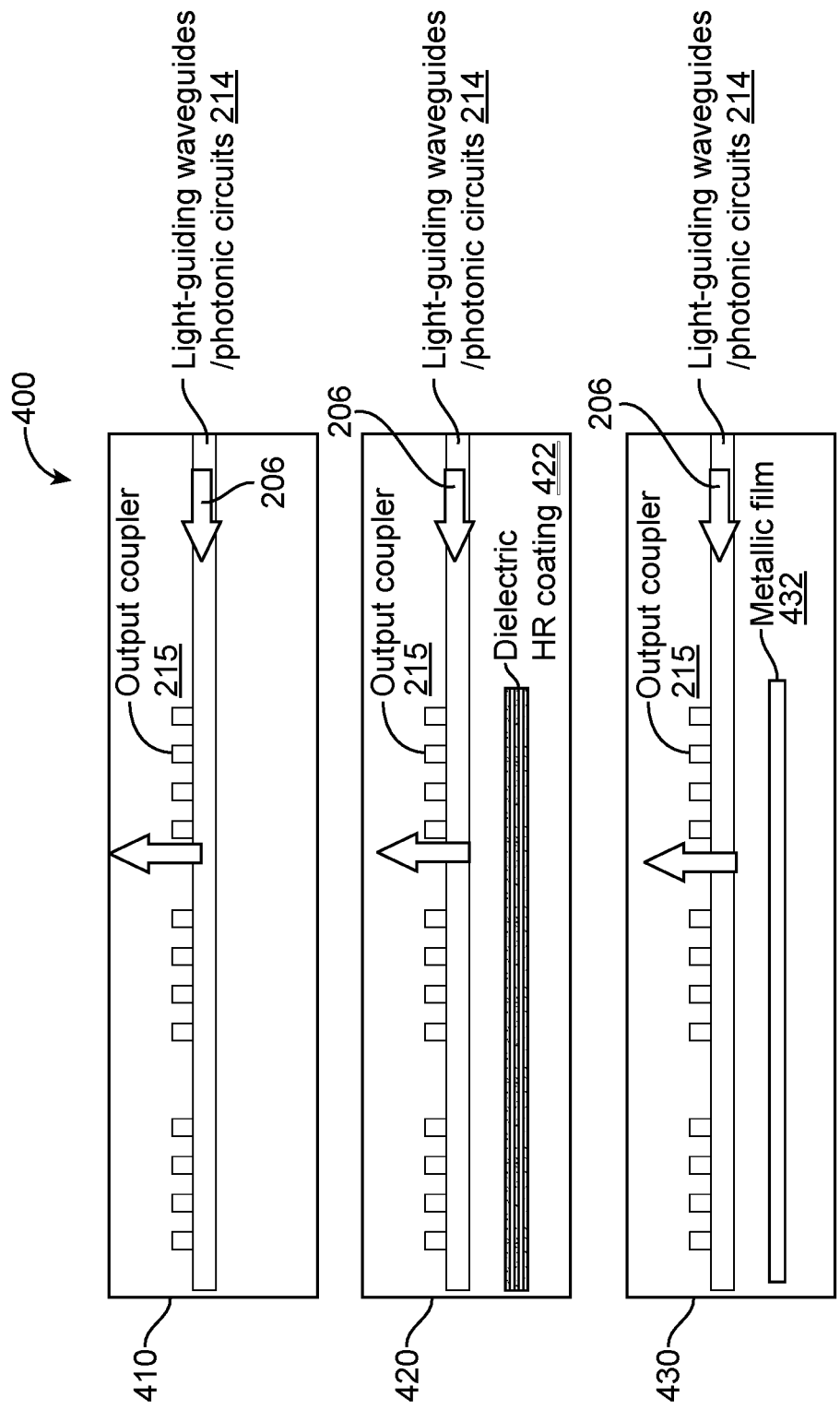
FIGS. 4A-4B illustrates views of various configurations for a photonic integrated circuit layer included in the composite backplane of FIG. 2, according to various embodiments of the present disclosure.
Figure 4B:
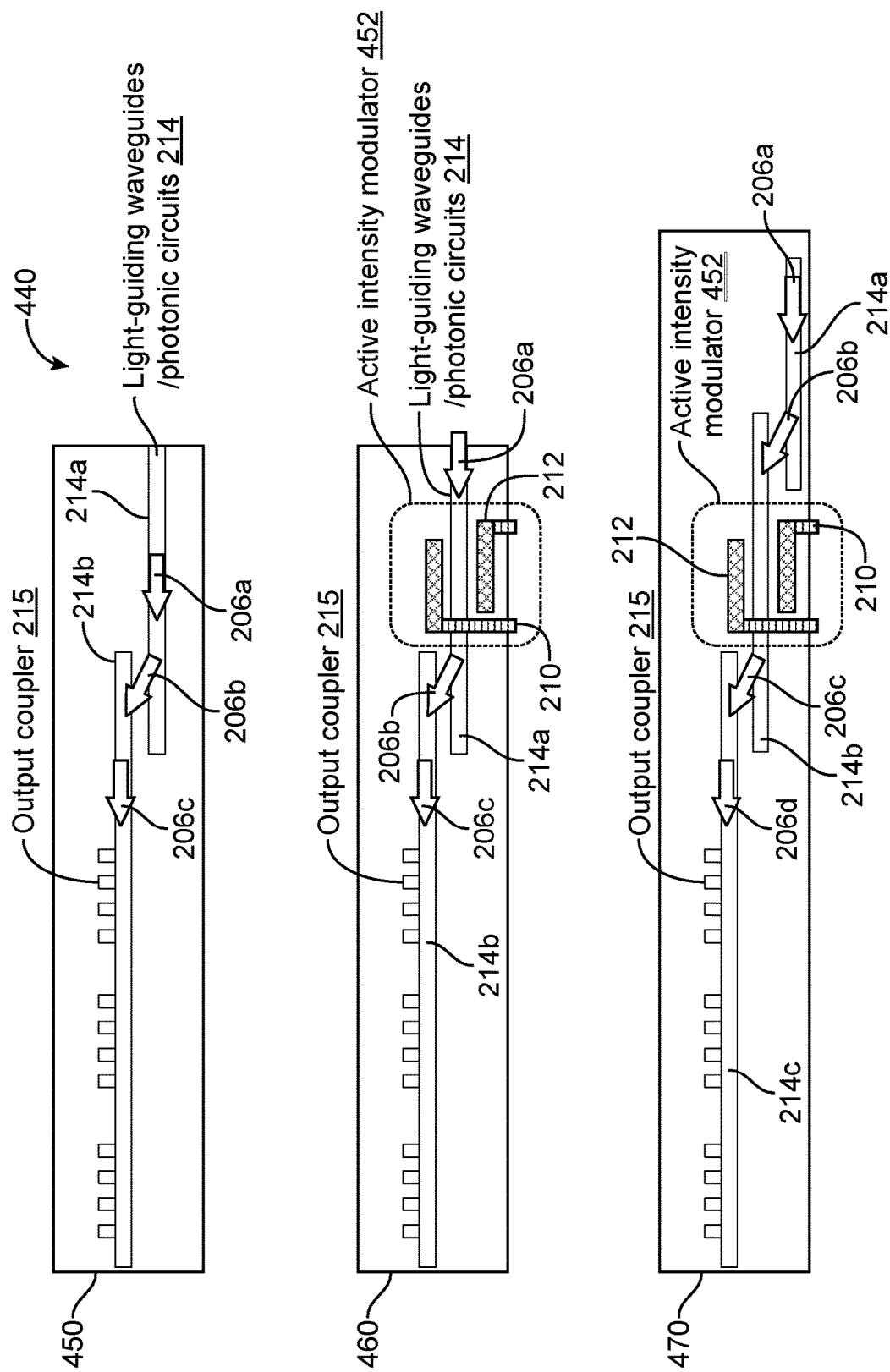

FIGS. 4A-4B illustrate views of various configurations for a photonic integrated circuit layer included in the composite backplane 200 of FIG. 2, according to various embodiments of the present disclosure. As shown in FIG. 4A, a set of candidate photonic IC layers 400 include candidate photonic IC layer configurations 410-430; as shown in FIG. 4B, a second set of candidate photonic IC layers 440 include multi-layer photonic IC layer configurations 450-470.

In various embodiments, each of the candidate photonic IC layers 400, 440 may include a single layer or multiple layers of photonic integrated circuits (PICs) 214 embedded in a substrate. In operation, the PICs 214 may include color multiplexers (MUX), color demultiplexers (DEMUX), waveguides, couplers, splitters, active light modulating components, and/or out-coupling components. The active PIC components can include amplitude modulators, phase modulators, polarization modulators, etc. that provide active control in the property of the emitted light. Each of the active PIC components can be driven by electronic circuitry built in the electronic IC layer and connected with vertical metallic vias. Each active PIC component 214 can perform various operations on incoming light, such as focusing, splitting, isolation, polarization modulation, coupling, amplitude modulation and/or phase modulation.

In various embodiments, some of the PIC components may be light-coupling components that connect the PICs 214 to the light source. For example, the light-coupling components may be optical fibers, light guides, waveguides, nanowires, microwires, lenses, waveguide-grating couplers, waveguide mode converter, lensed fibers, metalenses, plasmonics-based couplers, and so forth. In various embodiments, some of the PIC components may be out-coupling components, such as output couplers 215 that couple light from the PICs 214 and turn the wavelengths of light 206 into free space in a specific direction (e.g., direct the light vertically towards the active medium layer). Additionally or alternatively, the out-coupling components may include waveguide grating couplers, ring resonators, side-coupled scatterers, top-coupled scatterers, etc. The gratings can contain multi-material-layers, multi-etch-depth, straight or slanted, or any combination.

In some embodiments, a given configuration 420, 430 may include an additional layer, such as a dielectric high-reflective (HR) coating 422 or a metallic film 432 beneath the PICs 214 in order to improve the out-coupling efficiency of the output couplers 215 by reflecting some of the light towards the pixel cells. Additionally or alternatively, a particular configuration 410-430, 450-470 may be selected based on a set of design, fabrication, and/or operating characteristics. For example, a designer could select specific materials and fabrication processes for the photonics IC layer 400, 440 in order to be compatible with the fabrication of the ALM interface layer 122 and/or the electronic IC layer 126 (e.g., maximum processing temperature, material compatibility, etc.).

In various embodiments, as shown in FIG. 4B, some configurations 450-470 may include multiple layers of PICs 214 (e.g., 214a, 214b, 214c, etc.). In such instances, the light 206a from the light source may be coupled (as illustrated by 206b) between a first layer of waveguides 214a and a second layer of waveguides 214b. In some embodiments, the configuration 460 may include an active intensity modulator 452 that dynamically controls properties of the light 206. In some embodiments, the photonic IC layer 440 may include various PIC layers 214 (e.g., 1-6 layers) of varying lengths. For example, configurations 450, 460 include two PIC layers 214 and configuration 470 includes three PIC layers 214 and multiple active intensity modulators 452.

Figure 5A:
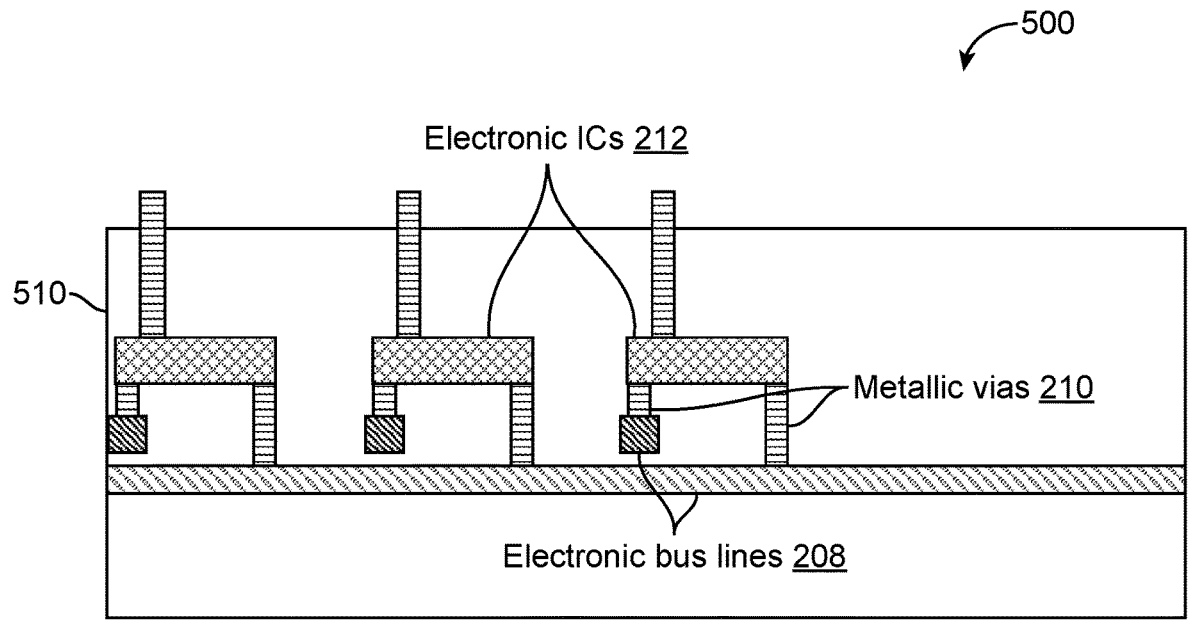
FIGS. 5A-5B illustrates views of various configurations for an electronics integrated circuit layer included in the composite backplane of FIG. 2, according to various embodiments of the present disclosure.
Figure 5A:
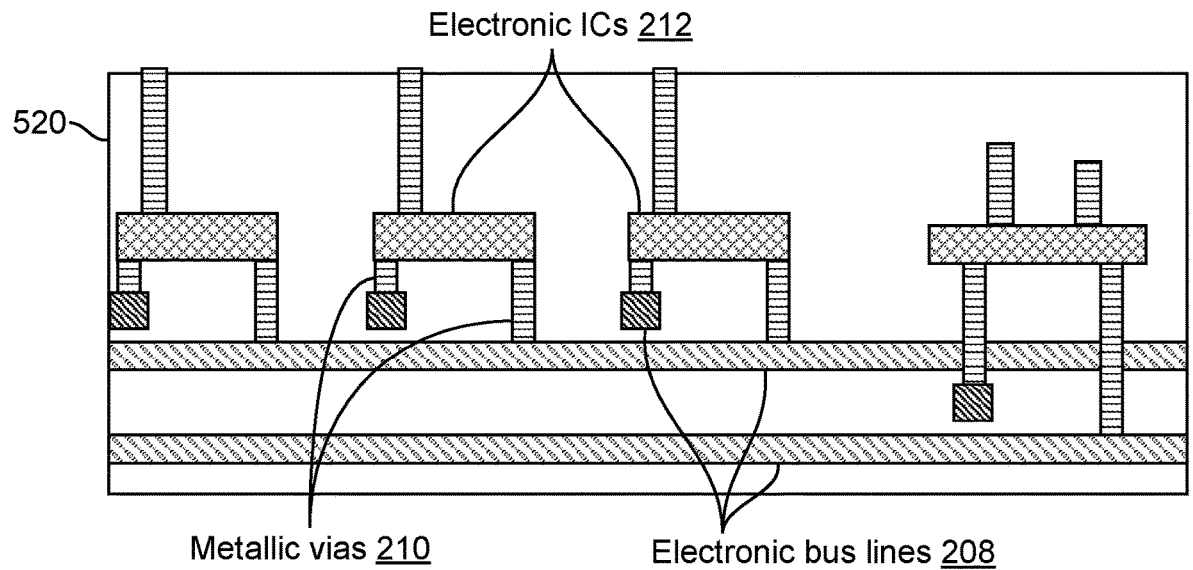
Figure 5B:
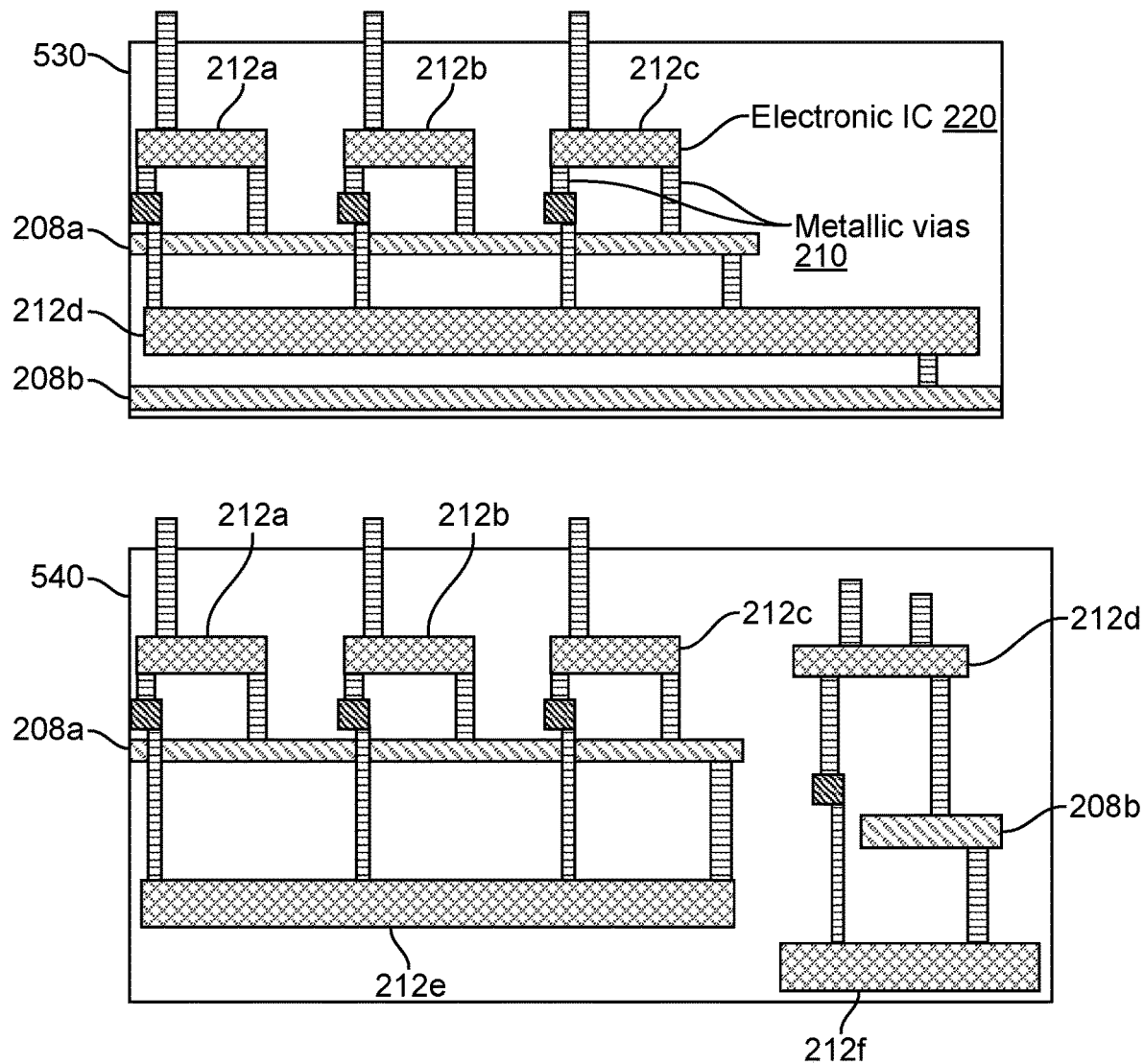

FIGS. 5A-5B illustrate views of various configurations for an electronics integrated circuit (IC) layer included in the composite backplane of FIG. 2, according to various embodiments of the present disclosure. As shown, a set of candidate electronics IC layers 500 include candidate electronic IC layer configurations 510-540.

In various embodiments, each of the configurations 510-540 may incorporate complementary metal-oxide-semiconductor (CMOS) technology or other semiconductor IC technology (e.g., PMOS and NMOS). The electronic modules included in the electronics IC layer 500 may be based on Silicon wafers (similar to LCOS technology), or using TFT technology (α-Si, low-temperature polycrystalline silicon (LTPS), Organic-TFT, oxide-TFT, LTPS+oxide-TFT, etc.) on transparent substrates.

In various embodiments, the electronic IC layer 500 may contain power, data, and other electronic bus lines, as well as circuitry for each active pixel cell to drive a set of active media included in the pixel cell. For example, configuration 530 includes a set of electronic IC modules 212a, 212b, 212c that drive separate pixelated electrodes 220. Each electronic module 212 is connected to the component in using metallic via paths 210 that may be positioned between components, such as metallic vias being positioned between the PIC components 214 in the photonic IC layer 124 in order to connect to the pixelated electrodes 220 in the ALM interface layer 122. In another example, the configuration 540 includes one or more electronic modules 212d for the PIC components (e.g., active PIC components) in the photonic IC layer 124. The electronic module 212d is connected to the active PIC component through metallic vias that connect to the active PIC component in the photonic IC layer 124.

In some embodiments, the electronics IC layer 500 may contain additional circuitry (e.g., metallic vias 210, electronic bus lines 208) and/or additional electronic modules 212e. For example, the configuration 540 includes additional electronic modules (e.g., modules 212e for the ALM interface layer 122, modules 212f for the photonics IC layer 124) in order to provide on-chip processing of data for a display panel. The additional electronic modules 212e, 212f could improve the power consumption, data processing, transfer speed by transmitting commands to other electronic ICs 212 that control the components in the other layers 122-124.

Figure 6B:
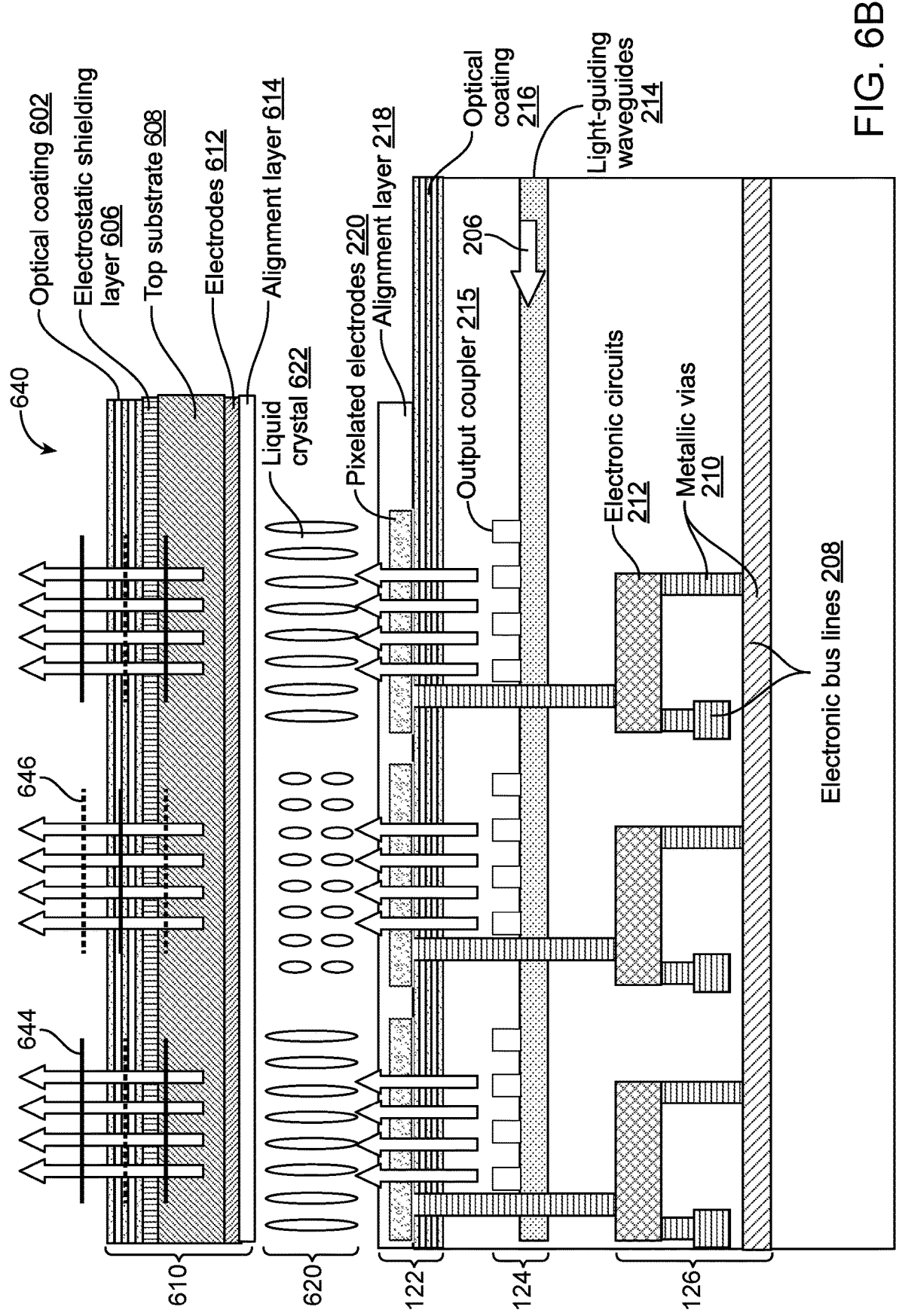
Figure 6C:
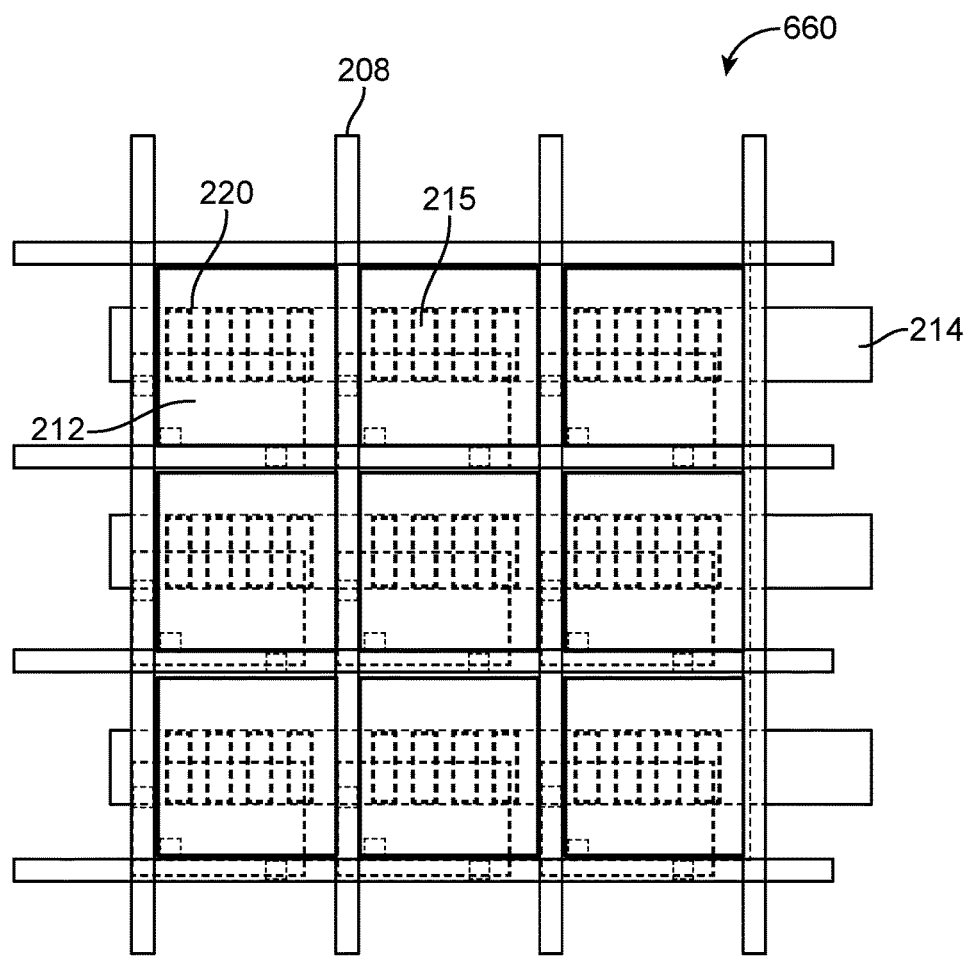
Figure 6C:
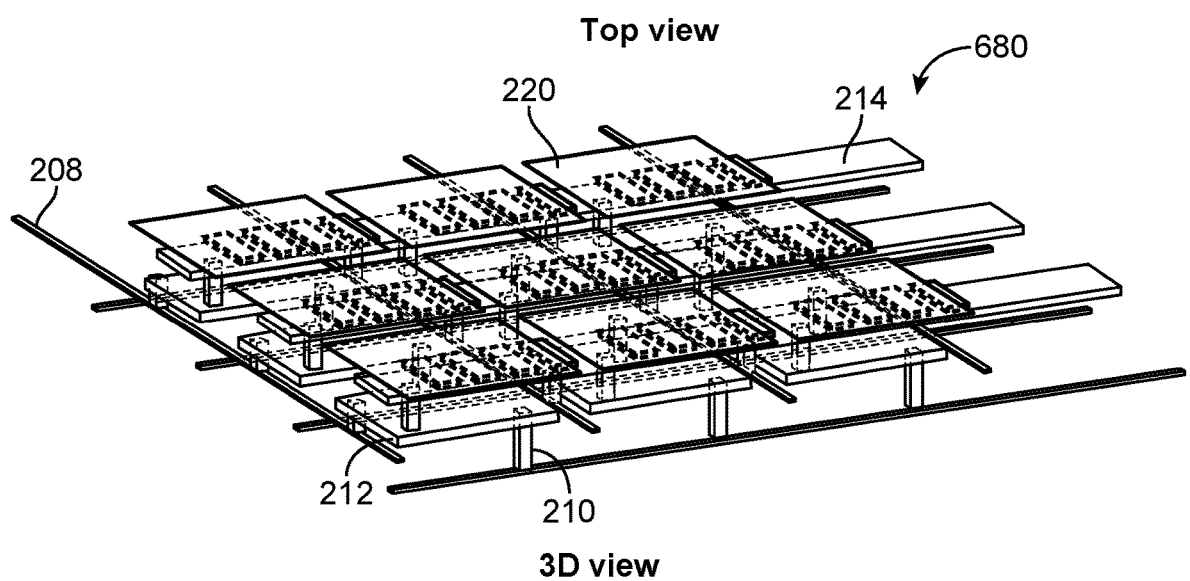

FIGS. 6A-6C illustrate views of various configurations for a cell 600 including the composite backplane 200 of FIG. 2, according to various embodiments of the present disclosure. As shown in FIG. 6A, the cell 600 includes the substrate 128, the electronics IC layer 126, the photonics IC layer 124, the ALM interface layer 122, an active medium layer 620, and top layer 610. In some embodiments, the top layer 610 may include an optical coating 602 (e.g., an AR coating), a polarizer layer 604, an electrostatic shielding layer 606, a top substrate 608, an electrode layer 614 and/or an alignment layer 614. Although cell 600 is shown with liquid crystals as the active media, the cell 600 can include other active media in lieu of liquid crystals in the active media layer 620.

In operation, the pixelated electrodes 220 control separate sets of active media, such as liquid crystals 622 included in the active medium layer 620, in order to control the light output from the cell 600. For example, the pixelated electrodes 220 could separately modulate the amplitude of separate subsets of liquid crystals 622 in order to modify the amplitude of light output from the cell 600. In other embodiments, the pixelated electrodes 220 may control other types of active media.

As shown in FIG. 6B, the pixelated electrodes 220 could separately modulate the phase of separate subsets of liquid crystals 622 in order to modify the light output from the cell 640. In such instances, the top layer 610 may not include the polarizer layer 604. The respective portions 644, 646 of the light 206 output by the cell 622 may have different polarizations based on the polarization of the different subsets of the liquid crystals 622.

As shown in FIG. 6C, the portion of a pixel cell illustrates a top view 660 and an isometric view 680 of portions of the composite backplane 200 included in the cells 600, 640. As shown in the respective top and isometric views 660, 680, the metallic vias 210 and electronic buses 208 are positioned in locations to provide connections to other components in other layers (e.g., the output couplers 215, the pixelated electrodes 220) and minimize obstruction of wavelengths of light 206 as the light propagates through the composite backplane 200.

Figure 7:
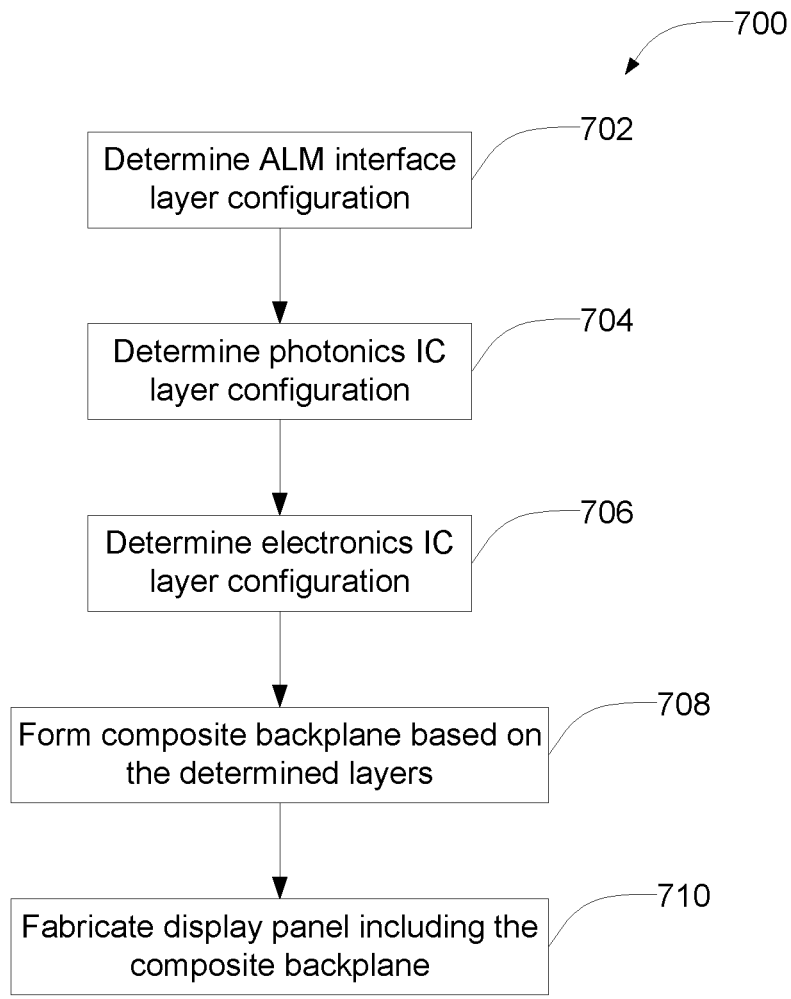
FIG. 7 sets forth a flow diagram of method steps for fabricating a composite backplane for a display panel, according to the various embodiments of the present disclosure.

FIG. 7 sets forth a flow diagram of method steps 700 for fabricating a composite backplane for a display panel, according to the various embodiments of the present disclosure. Although the method steps are described in conjunction with FIGS. 1-6C, persons of ordinary skill in the art will understand that any system configured to perform this method and/or methods described herein, in any order, and in any combination not logically contradicted, is within the scope of the present disclosure.

As shown, the method 700 begins at step 702, where the fabrication system 110 determines a configuration for the electronics IC layer 126. In various embodiments, the fabrication application 106 included in the fabrication system 110 may receive indications of a specific configuration of components (e.g., electrodes 220) used to control sets of active media in a separate active media layer 620. In some embodiments, the configuration may include additional characteristics and/or components, such as the location of the black matrix layer 217, optical coating layer 216, and/or the alignment layer 218.

In some embodiments, the fabrication application 106 may optimize the configuration of one or more layers 122-126 based on a target configuration. For example, an operator could identify one or more separate characteristics (e.g., light source type, light source position, modulation type, etc.) of a device that will include the composite backplane 121. In such instances, the fabrication application 106 could determine the components to include in each respective layer 122-126 and position components within each layer 122-126 in an arrangement that enables the composite backplane 121 to possess the characteristics specified in the target configuration.

At step 704, the fabrication system 110 determines a configuration for the photonics IC layer 124. In various embodiments, the fabrication application 106 may receive indications of a specific configuration of components, such as specific photonic circuits 214, output couplers 215, and/or additional layers 422, 432 to include in the photonic IC layer 124. The photonic layer 124 uses the specified components to control the wavelengths of light 206 from the light source. In some embodiments, the photonic IC layer 124 includes active PIC components (e.g., amplitude, phase, and/or polarization modulators) that actively control the light 206.

At step 706, the fabrication system 110 determines a configuration for the electronics IC layer 126. In various embodiments, the fabrication application 106 may receive indications of a specific configuration of components to include in the electronics IC layer 126. In some embodiments, the components include specific integrated circuit modules used to control the operation of components in other layers, such as the electrodes 220 in the ALM interface layer 122 and/or the active PIC components in the photonic IC layer 124. In some embodiments, the electronics IC layer 126 may include additional components, such as additional bus lines 208 for power, metallic via paths 210 for communication, and/or additional electronic IC modules 212 for data processing.

At step 708, the fabrication system 110 forms a composite backplane 200 based on the determined layers. In various embodiments, the fabrication application 106 may produce a composite backplane 121 that includes each of the determined layers 122-126. Upon determining the design for the composite backplane 121, the fabrication system 110 causes the wafer loader 116 to manipulate the wafer 102 and uses the projection lens 112 and photomask 114 to pattern portions of the wafer 102 to generate etched backplane 120 that includes multiple panels of the composite backplane 121. In various embodiments, the fabrication system may use various lithography-based nano-manufacturing processes associated with fabricating electronic components and/or photonic components in order to pattern various the etched backplanes 120 on the wafer 102.

At step 710, the fabrication system 110 fabricates a display panel that includes the composite backplane 200. In various embodiments, the fabrication system 100 combines the composite backplane 121 with other layers, such as the active medium layer 620, top layer 610, and/or components to fabricate display assemblies, such as a display panel, a device containing a display panel (e.g., a mobile phone, tablet, wearable near-eye display, etc.), and so forth. In various embodiments, the fabricated display panel does not require post-fabrication alignment of the components included in the composite backplane 121.

The Artificial Reality System

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) or near-eye display (NED) connected to a host computer system, a standalone HMD or NED, a mobile device or computing system, or any other hardware platform capable of providing artificial reality content to one or more viewers.

Figure 8:
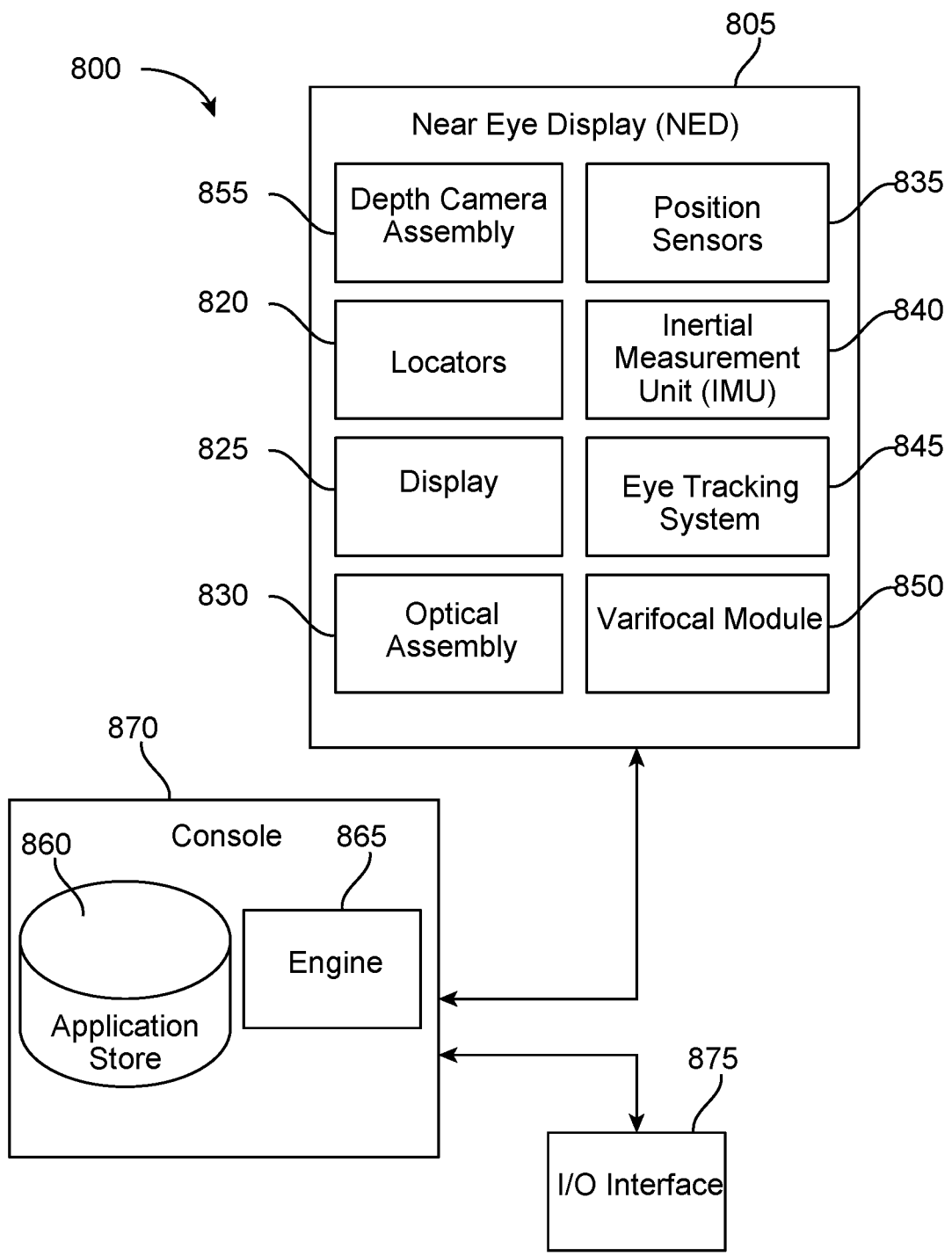
FIG. 8 is a block diagram of an embodiment of a near-eye display (NED) system in which a console operates, according to various embodiments.

FIG. 8 is a block diagram of an embodiment of a near-eye display (NED) system 800 in which a console operates, according to various embodiments. The NED system 800 may operate in a virtual reality (VR) system environment, an augmented reality (AR) system environment, a mixed reality (MR) system environment, or some combination thereof. The NED system 800 shown in FIG. 8 comprises a NED 805 and an input/output (I/O) interface 875 that is coupled to the console 870. In various embodiments, the composite display system 800 is included in or operates in conjunction with the NED system 800. For example, the composite display system 800 may be included within NED 805 or may be coupled to the console 870 and/or the NED While FIG. 8 shows an example NED system 800 including one NED 805 and one I/O interface 875, in other embodiments any number of these components may be included in the NED system 800. For example, there may be multiple NEDs 805, and each NED 805 has an associated I/O interface 875. Each NED 805 and I/O interface 875 communicates with the console 870. In alternative configurations, different and/or additional components may be included in the NED system 800. Additionally, various components included within the NED 805, the console 870, and the I/O interface 875 may be distributed in a different manner than is described in conjunction with FIGS. 1-3B in some embodiments. For example, some or all of the functionality of the console 870 may be provided by the NED 805 and vice versa.

The NED 805 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 805 may also present audio content to a user. The NED 805 and/or the console 870 may transmit the audio content to an external device via the I/O interface 875. The external device may include various forms of speaker systems and/or headphones. In various embodiments, the audio content is synchronized with visual content being displayed by the NED 805.

The NED 805 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 8, the NED 805 may include a depth camera assembly (DCA) 855, one or more locators 820, a display 825, an optical assembly 830, one or more position sensors 835, an inertial measurement unit (IMU) 840, an eye tracking system 845, and a varifocal module 850. In some embodiments, the display 825 and the optical assembly 830 can be integrated together into a projection assembly. Various embodiments of the NED 805 may have additional, fewer, or different components than those listed above. Additionally, the functionality of each component may be partially or completely encompassed by the functionality of one or more other components in various embodiments.

The DCA 855 captures sensor data describing depth information of an area surrounding the NED 805. The sensor data may be generated by one or a combination of depth imaging techniques, such as triangulation, structured light imaging, time-of-flight imaging, stereo imaging, laser scan, and so forth. The DCA 855 can compute various depth properties of the area surrounding the NED 805 using the sensor data. Additionally or alternatively, the DCA 855 may transmit the sensor data to the console 870 for processing. Further, in various embodiments, the DCA 855 captures or samples sensor data at different times. For example, the DCA 855 could sample sensor data at different times within a time window to obtain sensor data along a time dimension.

The DCA 855 includes an illumination source, an imaging device, and a controller. The illumination source emits light onto an area surrounding the NED 805. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light in the environment surrounding NED 805, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The locators 820 are objects located in specific positions on the NED 805 relative to one another and relative to a specific reference point on the NED 805. A locator 820 may be a light emitting diode (LED), a corner cube reflector, a reflective marker, a type of light source that contrasts with an environment in which the NED 805 operates, or some combination thereof. In embodiments where the locators 820 are active (i.e., an LED or other type of light emitting device), the locators 820 may emit light in the visible band (~380 nm to 950 nm), in the infrared (IR) band (~950 nm to 9700 nm), in the ultraviolet band (70 nm to 380 nm), some other portion of the electromagnetic spectrum, or some combination thereof.

In some embodiments, the locators 820 are located beneath an outer surface of the NED 805, which is transparent to the wavelengths of light emitted or reflected by the locators 820 or is thin enough not to substantially attenuate the wavelengths of light emitted or reflected by the locators 820. Additionally, in some embodiments, the outer surface or other portions of the NED 805 are opaque in the visible band of wavelengths of light. Thus, the locators 820 may emit light in the IR band under an outer surface that is transparent in the IR band but opaque in the visible band.

The display 825 displays two-dimensional or three-dimensional images to the user in accordance with pixel data received from the console 870 and/or one or more other sources. In various embodiments, the display 825 comprises a single display or multiple displays (e.g., separate displays for each eye of a user). In some embodiments, the display 825 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the display types may be incorporated in display 825 and used separately, in parallel, and/or in combination.

The optical assembly 830 magnifies image light received from the display 825, corrects optical errors associated with the image light, and presents the corrected image light to a user of the NED 805. The optical assembly 830 includes a plurality of optical elements. For example, one or more of the following optical elements may be included in the optical assembly 830: an aperture, a Fresnel lens, a convex lens, a concave lens, a filter, a reflecting surface, or any other suitable optical element that deflects, reflects, refracts, and/or in some way alters image light. Moreover, the optical assembly 830 may include combinations of different optical elements. In some embodiments, one or more of the optical elements in the optical assembly 830 may have one or more coatings, such as partially reflective or antireflective coatings.

In some embodiments, the optical assembly 830 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 825 is pre-distorted, and the optical assembly 830 corrects the distortion as image light from the display 825 passes through various optical elements of the optical assembly 830. In some embodiments, optical elements of the optical assembly 830 are integrated into the display 825 as a projection assembly that includes at least one waveguide coupled with one or more optical elements.

The IMU 840 is an electronic device that generates data indicating a position of the NED 805 based on measurement signals received from one or more of the position sensors 835 and from depth information received from the DCA 855. In some embodiments of the NED 805, the IMU 840 may be a dedicated hardware component. In other embodiments, the IMU 840 may be a software component implemented in one or more processors.

In operation, a position sensor 835 generates one or more measurement signals in response to a motion of the NED 805. Examples of position sensors 835 include: one or more accelerometers, one or more gyroscopes, one or more magnetometers, one or more altimeters, one or more inclinometers, and/or various types of sensors for motion detection, drift detection, and/or error detection. The position sensors 835 may be located external to the IMU 840, internal to the IMU 840, or some combination thereof.

Based on the one or more measurement signals from one or more position sensors 835, the IMU 840 generates data indicating an estimated current position of the NED 805 relative to an initial position of the NED 805. For example, the position sensors 835 include multiple accelerometers to measure translational motion (forward/back, up/down, left/right) and multiple gyroscopes to measure rotational motion (e.g., pitch, yaw, and roll). In some embodiments, the IMU 840 rapidly samples the measurement signals and calculates the estimated current position of the NED 805 from the sampled data. For example, the IMU 840 integrates the measurement signals received from the accelerometers over time to estimate a velocity vector and integrates the velocity vector over time to determine an estimated current position of a reference point on the NED 805. Alternatively, the IMU 840 provides the sampled measurement signals to the console 870, which analyzes the sample data to determine one or more measurement errors. The console 870 may further transmit one or more of control signals and/or measurement errors to the IMU 840 to configure the IMU 840 to correct and/or reduce one or more measurement errors (e.g., drift errors). The reference point is a point that may be used to describe the position of the NED 805. The reference point may generally be defined as a point in space or a position related to a position and/or orientation of the NED 805.

In various embodiments, the IMU 840 receives one or more parameters from the console 870. The one or more parameters are used to maintain tracking of the NED 805. Based on a received parameter, the IMU 840 may adjust one or more IMU parameters (e.g., a sample rate). In some embodiments, certain parameters cause the IMU 840 to update an initial position of the reference point so that it corresponds to a next position of the reference point. Updating the initial position of the reference point as the next calibrated position of the reference point helps reduce drift errors in detecting a current position estimate of the IMU 840.

In various embodiments, the eye tracking system 845 is integrated into the NED 805. The eye-tracking system 845 may comprise one or more illumination sources (e.g., infrared illumination source, visible light illumination source) and one or more imaging devices (e.g., one or more cameras). In operation, the eye tracking system 845 generates and analyzes tracking data related to a user's eyes as the user wears the NED 805. In various embodiments, the eye tracking system 845 estimates the angular orientation of the user's eye. The orientation of the eye corresponds to the direction of the user's gaze within the NED 805. The orientation of the user's eye is defined herein as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis is another axis of the eye that is defined as the axis passing through the center of the pupil and that is perpendicular to the corneal surface. The pupillary axis does not, in general, directly align with the foveal axis. Both axes intersect at the center of the pupil, but the orientation of the foveal axis is offset from the pupillary axis by approximately −1° to 8° laterally and ±4° vertically. Because the foveal axis is defined according to the fovea, which is located in the back of the eye, the foveal axis can be difficult or impossible to detect directly in some eye tracking embodiments. Accordingly, in some embodiments, the orientation of the pupillary axis is detected and the foveal axis is estimated based on the detected pupillary axis.

In general, movement of an eye corresponds not only to an angular rotation of the eye, but also to a translation of the eye, a change in the torsion of the eye, and/or a change in shape of the eye. The eye tracking system 845 may also detect translation of the eye, i.e., a change in the position of the eye relative to the eye socket. In some embodiments, the translation of the eye is not detected directly, but is approximated based on a mapping from a detected angular orientation. Translation of the eye corresponding to a change in the eye's position relative to the detection components of the eye tracking unit may also be detected. Translation of this type may occur, for example, due to a shift in the position of the NED 805 on a user's head. The eye tracking system 845 may also detect the torsion of the eye, i.e., rotation of the eye about the pupillary axis. The eye tracking system 845 may use the detected torsion of the eye to estimate the orientation of the foveal axis from the pupillary axis. The eye tracking system 845 may also track a change in the shape of the eye, which may be approximated as a skew or scaling linear transform or a twisting distortion (e.g., due to torsional deformation). The eye tracking system 845 may estimate the foveal axis based on some combination of the angular orientation of the pupillary axis, the translation of the eye, the torsion of the eye, and the current shape of the eye.

As the orientation may be determined for both eyes of the user, the eye tracking system 845 is able to determine where the user is looking. The NED 805 can use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other function that is based in part on the orientation of at least one of the user's eyes, or some combination thereof. Determining a direction of a user's gaze may include determining a point of convergence based on the determined orientations of the user's left and right eyes. A point of convergence may be the point that the two foveal axes of the user's eyes intersect (or the nearest point between the two axes). The direction of the user's gaze may be the direction of a line through the point of convergence and through the point halfway between the pupils of the user's eyes.

In some embodiments, the varifocal module 850 is integrated into the NED 805. The varifocal module 850 may be communicatively coupled to the eye tracking system 845 in order to enable the varifocal module 850 to receive eye tracking information from the eye tracking system 845. The varifocal module 850 may further modify the focus of image light emitted from the display 825 based on the eye tracking information received from the eye tracking system 845. Accordingly, the varifocal module 850 can reduce vergence-accommodation conflict that may be produced as the user's eyes resolve the image light. In various embodiments, the varifocal module 850 can be interfaced (e.g., either mechanically or electrically) with at least one optical element of the optical assembly 830.

In operation, the varifocal module 850 may adjust the position and/or orientation of one or more optical elements in the optical assembly 830 in order to adjust the focus of image light propagating through the optical assembly 830. In various embodiments, the varifocal module 850 may use eye tracking information obtained from the eye tracking system 845 to determine how to adjust one or more optical elements in the optical assembly 830. In some embodiments, the varifocal module 850 may perform foveated rendering of the image light based on the eye tracking information obtained from the eye tracking system 845 in order to adjust the resolution of the image light emitted by the display 825. In this case, the varifocal module 850 configures the display 825 to display a high pixel density in a foveal region of the user's eye-gaze and a low pixel density in other regions of the user's eye-gaze.

The I/O interface 875 facilitates the transfer of action requests from a user to the console 870. In addition, the I/O interface 875 facilitates the transfer of device feedback from the console 870 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 875 may include one or more input devices. Example input devices include: a keyboard, a mouse, a game controller, a joystick, and/or any other suitable device for receiving action requests and communicating the action requests to the console 870. In some embodiments, the I/O interface 875 includes an IMU 840 that captures calibration data indicating an estimated current position of the I/O interface 875 relative to an initial position of the I/O interface 875.

In operation, the I/O interface 875 receives action requests from the user and transmits those action requests to the console 870. Responsive to receiving the action request, the console 870 performs a corresponding action. For example, responsive to receiving an action request, console 870 may configure I/O interface 875 to emit haptic feedback onto an arm of the user. For example, console 870 may configure I/O interface 875 to deliver haptic feedback to a user when an action request is received. Additionally or alternatively, the console 870 may configure the I/O interface 875 to generate haptic feedback when the console 870 performs an action, responsive to receiving an action request.

The console 870 provides content to the NED 805 for processing in accordance with information received from one or more of: the DCA 855, the eye tracking system 845, one or more other components of the NED 805, and the I/O interface 875. In the embodiment shown in FIG. 8, the console 870 includes an application store 860 and an engine 865. In some embodiments, the console 870 may have additional, fewer, or different modules and/or components than those described in conjunction with FIG. 8. Similarly, the functions further described below may be distributed among components of the console 870 in a different manner than described in conjunction with FIG. 8.

The application store 860 stores one or more applications for execution by the console 870. An application is a group of instructions that, when executed by a processor, performs a particular set of functions, such as generating content for presentation to the user. For example, an application may generate content in response to receiving inputs from a user (e.g., via movement of the NED 805 as the user moves his/her head, via the I/O interface 875, etc.). Examples of applications include: gaming applications, conferencing applications, video playback applications, or other suitable applications.

In some embodiments, the engine 865 generates a three-dimensional mapping of the area surrounding the NED 805 (i.e., the "local area") based on information received from the NED 805. In some embodiments, the engine 865 determines depth information for the three-dimensional mapping of the local area based on depth data received from the NED 805. In various embodiments, the engine 865 uses depth data received from the NED 805 to update a model of the local area and to generate and/or modify media content based in part on the updated model of the local area.

The engine 865 also executes applications within the NED system 800 and receives position information, acceleration information, velocity information, predicted future positions, or some combination thereof, of the NED 805. Based on the received information, the engine 865 determines various forms of media content to transmit to the NED 805 for presentation to the user. For example, if the received information indicates that the user has looked to the left, the engine 865 generates media content for the NED 805 that mirrors the user's movement in a virtual environment or in an environment augmenting the local area with additional media content. Accordingly, the engine 865 may generate and/or modify media content (e.g., visual and/or audio content) for presentation to the user. The engine 865 may further transmit the media content to the NED 805. Additionally, in response to receiving an action request from the I/O interface 875, the engine 865 may perform an action within an application executing on the console 870. The engine 865 may further provide feedback when the action is performed. For example, the engine 865 may configure the NED 805 to generate visual and/or audio feedback and/or the I/O interface 875 to generate haptic feedback to the user.

In some embodiments, based on the eye tracking information (e.g., orientation of the user's eye) received from the eye tracking system 845, the engine 865 determines a resolution of the media content provided to the NED 805 for presentation to the user on the display 825. The engine 865 may adjust a resolution of the visual content provided to the NED 805 by configuring the display 825 to perform foveated rendering of the visual content, based at least in part on a direction of the user's gaze received from the eye tracking system 845. The engine 865 provides the content to the NED 805 having a high resolution on the display 825 in a foveal region of the user's gaze and a low resolution in other regions, thereby reducing the power consumption of the NED 805. In addition, using foveated rendering reduces a number of computing cycles used in rendering visual content without compromising the quality of the user's visual experience. In some embodiments, the engine 865 can further use the eye tracking information to adjust a focus of the image light emitted from the display 825 in order to reduce vergence-accommodation conflicts.

Figure 9A:
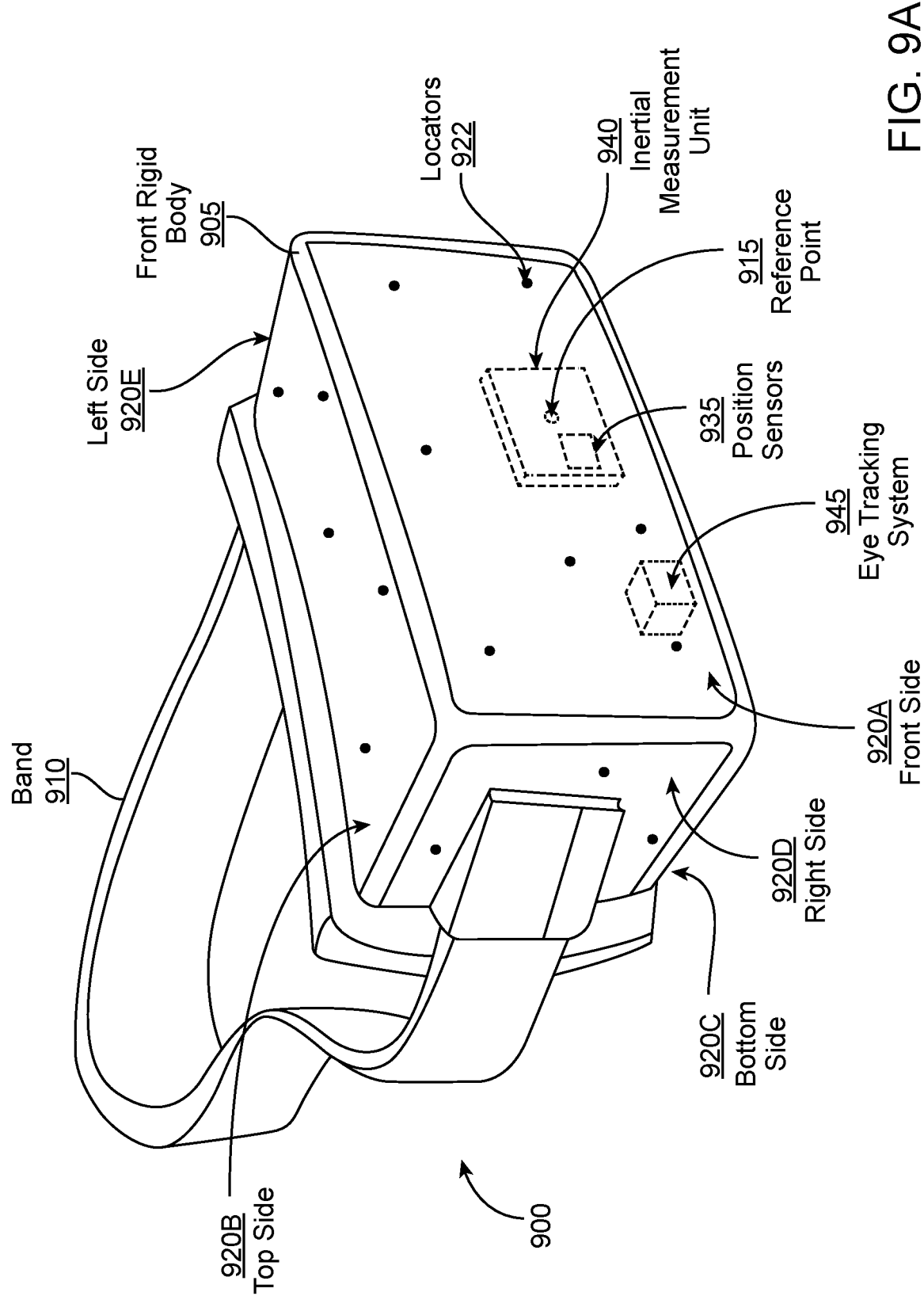
FIG. 9A is a diagram of an NED, according to various embodiments.

FIG. 9A is a diagram of an NED 900, according to various embodiments. In various embodiments, NED 900 presents media to a user. The media may include visual, auditory, and haptic content. In some embodiments, NED 900 provides artificial reality (e.g., virtual reality) content by providing a real-world environment and/or computer-generated content. In some embodiments, the computer-generated content may include visual, auditory, and haptic information. The NED 900 is an embodiment of the NED 805 and includes a front rigid body 905 and a band 910. The front rigid body 905 includes an electronic display element of the electronic display 825 (not shown in FIG. 9A), the optics assembly 830 (not shown in FIG. 9A), the IMU 840, the one or more position sensors 935, the eye tracking system 945, and the locators 922. In the embodiment shown by FIG. 9A, the position sensors 935 are located within the IMU 840, and neither the IMU 840 nor the position sensors 935 are visible to the user.

The locators 922 are located in fixed positions on the front rigid body 905 relative to one another and relative to a reference point 915. In the example of FIG. 9A, the reference point 915 is located at the center of the IMU 840. Each of the locators 922 emits light that is detectable by the imaging device in the DCA 855. The locators 922, or portions of the locators 922, are located on a front side 920A, a top side 920B, a bottom side 920C, a right side 920D, and a left side 920E of the front rigid body 905 in the example of FIG. 9A.

The NED 900 includes the eye tracking system 945. As discussed above, the eye tracking system 945 may include a structured light generator that projects an interferometric structured light pattern onto the user's eye and a camera to detect the illuminated portion of the eye. The structured light generator and the camera may be located off the axis of the user's gaze. In various embodiments, the eye tracking system 945 may include, additionally or alternatively, one or more time-of-flight sensors and/or one or more stereo depth sensors. In FIG. 9A, the eye tracking system 945 is located below the axis of the user's gaze, although the eye tracking system 945 can alternately be placed elsewhere. Also, in some embodiments, there is at least one eye tracking unit for the left eye of the user and at least one tracking unit for the right eye of the user.

In various embodiments, the eye tracking system 945 includes one or more cameras on the inside of the NED 900. The camera(s) of the eye tracking system 945 may be directed inwards, toward one or both eyes of the user while the user is wearing the NED 900, so that the camera(s) may image the eye(s) and eye region(s) of the user wearing the NED 900. The camera(s) may be located off the axis of the user's gaze. In some embodiments, the eye tracking system 945 includes separate cameras for the left eye and the right eye (e.g., one or more cameras directed toward the left eye of the user and, separately, one or more cameras directed toward the right eye of the user).

Figure 9B:
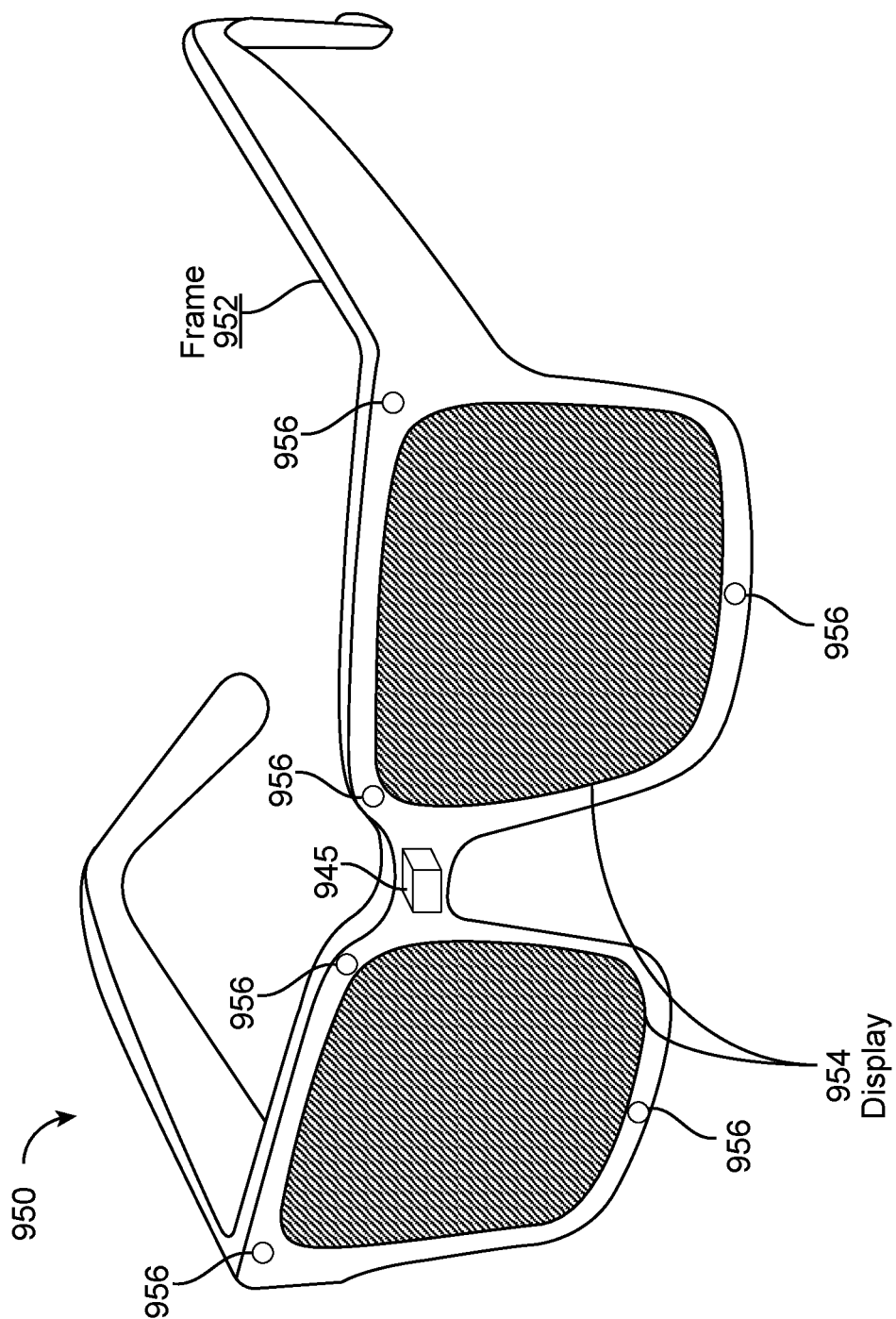
FIG. 9B is another diagram of an NED, according to various embodiments.

FIG. 9B is a diagram of an NED 950, according to various embodiments. In various embodiments, NED 950 presents media to a user. The media may include visual, auditory, and haptic content. In some embodiments, NED 950 provides artificial reality (e.g., augmented reality) content by providing a real-world environment and/or computer-generated content. In some embodiments, the computer-generated content may include visual, auditory, and haptic information. The NED 950 is an embodiment of the NED 805.

NED 950 includes frame 952 and display 954. In various embodiments, the NED 950 may include one or more additional elements. Display 954 may be positioned at different locations on the NED 950 than the locations illustrated in FIG. 9B. Display 954 is configured to provide content to the user, including audiovisual content. In some embodiments, one or more displays 954 may be located within frame 952.

NED 950 further includes eye tracking system 945 and one or more corresponding modules 956. The modules 956 may include emitters (e.g., light emitters) and/or sensors (e.g., image sensors, cameras). In various embodiments, the modules 956 are arranged at various positions along the inner surface of the frame 952, so that the modules 956 are facing the eyes of a user wearing the NED 950. For example, the modules 956 could include emitters that emit structured light patterns onto the eyes and image sensors to capture images of the structured light pattern on the eyes. As another example, the modules 956 could include multiple time-of-flight sensors for directing light at the eyes and measuring the time of travel of the light at each pixel of the sensors. As a further example, the modules 956 could include multiple stereo depth sensors for capturing images of the eyes from different vantage points. In various embodiments, the modules 956 also include image sensors for capturing 2D images of the eyes.

In sum, a die fabrication system integrates a active light modulation interface layer, a photonic integrated circuit layer, and an electronic integrated circuit layer on a substrate to form a composite backplane. The composite backplane is added to an active medium layer and a top layer to form a composite display panel, such as a liquid crystal display (LCD) panel. The composite backplane 121 includes at least three layers that are fabricated in sequence using a standard lithographic manufacturing process. The layers include an active light modulation interface layer 122 that includes a set of pixelated electrodes for controlling groups of active media that modify the amplitude or phase of wavelengths of light propagating through the active media. The composite backplane also includes a photonic integrated circuit layer that includes light-guiding waveguides and coupling components to control the modulation and direction of wavelengths of light generated by a light source. The composite backplane also includes an electronic integrated circuit layer that includes electronic bus lines and integrated electronic circuitry for components in the active light modulation interface layer and the photonic integrated circuit layer.

At least one technical advantage of the disclosed embodiments relative to the prior art is that the composite backplane provides an overall compact size, small weight, and reduced system complexity. In particular, the composite backplane does not require post-fabrication alignment between a photonic integrated circuit layer and an active light modulation interface, or alignment between bottom and top substrates of a liquid crystal cell. Further, a distance between the photonic integrated circuit layer and an active medium layer is greatly reduced, which improves performance of the display panel by increasing the light efficiency, reducing optical crosstalk, and providing greater control on the emission cones generated by the light source. In addition, the composition of the composite backplane improves the fill factor of a display panel due to the arrangement of the photonic integrated circuit layer over the electronic integrated circuit layer.

1. In various embodiments, an apparatus comprises a composite backplane that modulates light from a light source, comprising an electronics layer disposed on a substrate, a photonics integrated circuit (IC) layer disposed on the electronics layer that causes light from the light source to propagate in a first direction, and an active light modulation (ALM) interface layer disposed on the photonics IC layer controls an active medium layer in order to control the light propagating in the first direction.

2. The apparatus of clause 1, where the ALM interface layer comprises a set of electrodes that modulate one or more pixels, an alignment layer between the set of electrodes, and at least one of an anti-reflection (AR) or a partial-reflection (PR) coating, where the set of electrodes modulate the light propagating in the first direction by controlling corresponding pixels.

3. The apparatus of clause 1 or 2, where the ALM interface layer further comprises a black matrix layer interspersed between the set of electrodes, the active medium layer comprises a layer of liquid crystals as an active light modulation medium, and the alignment layer is disposed on the black matrix layer and the set of electrodes.

4. The apparatus of any of clauses 1-2, where the photonics IC layer comprises one or more light-guiding waveguides that receive the light produced by the light source and perform a set of optical operations, and a set of output couplers that direct the light from the one or more light-guiding waveguides to propagate in the first direction.

5. The apparatus of any of clauses 1-4, where the light source comprises at least one of a light-emitting diode or a laser.

6. The apparatus of any of clauses 1-5, where the photonics IC layer further comprises a light-coupling component that connects the light source with the one or more light-guiding waveguides.

7. The apparatus of any of clauses 1-6, where the photonics IC layer further comprises a set of optical couplers and a set of intensity modulators, wherein the set of optical couplers and the set of intensity modulators direct at least a portion of the light included in a first light-guiding waveguide to a second light-guiding waveguide.

8. The apparatus of any of clauses 1-7, where the electronics layer comprises a first electronic circuit that controls a device included in the ALM interface layer, a first metallic via path through the electronics layer and the photonics IC layer that couples first electronic circuit to the device included in the ALM interface layer, a second electronic circuit that controls a device included in the photonics IC layer, and a second metallic via path through the electronics layer that couples the second electronic circuit to the device included in the photonics IC layer.

9. The apparatus of any of clauses 1-8, where the electronics layer further comprises at least a set of electronic circuits that are connected to the first electronic circuit or the second electronic circuit via additional via paths, and the set of electronic circuits process input data and generates a set of one or more control signals for the ALM interface layer or the photonics IC layer.

10. The apparatus of any of clauses 1-9, further comprising an active medium layer disposed on the ALM interface layer comprising sets of active media included in a set of pixels, and a top cover layer disposed on the active medium layer, where the sets of active media modify at least one property of the light propagating in the first direction; and each pixel in a set of pixels independently modulates a portion of the light propagating in the first direction.

11. In various embodiments, a display system comprises a display panel comprising a composite backplane, including an electronics layer disposed on a substrate, a photonics integrated circuit (IC) layer disposed on the electronics layer that directs light from a light source to propagate in a first direction, and an active light modulation (ALM) interface layer disposed the photonics IC layer, an active medium layer disposed on the ALM interface layer comprising sets of pixels including sets of an active media, and a top cover layer, and a controller causing the display panel to modify the light controlled via the active medium layer or the photonic IC layer.

12. The system of clause 11, where the top cover layer comprises at least one of a photoalignment layer, an electrode layer, or a mechanical supporting layer.

13. The system of clause 11 or 12, where the light source comprises at least one of a light-emitting diode (LED), a laser, a superluminescent LED, or a nonlinear optical source, and the photonics IC layer further comprises a light-coupling component that connects the light source with the one or more light-guiding waveguides.

14. The system of any of clauses 11-13, where each pixel in the set of pixels independently modulates at least one property of the light propagating in the first direction.

15. The system of any of clauses 11-14, where the ALM interface layer includes a set of electrodes that modulate the light propagating in the first direction by controlling the sets of the active media, and the controller causes the display panel to modify the light by sending control signals to the set of electrodes.

16. The system of any of clauses 11-15, where the photonics IC layer comprises one or more light-guiding waveguides that receive the light produced by the light source and perform a set of optical operations, and a set of output couplers that direct the light from the one or more light-guiding waveguides to propagate in the first direction, where the controller causes the display panel to modify the light by sending control signals to at least one of the one or more light-guiding waveguides or the set of output couplers.

17. The system of any of clauses 11-16, where the display panel performs amplitude modulation on the light provided by the light source.

18. The system of any of clauses 11-17, where the display panel comprises a holographic display that performs phase modulation on the light provided by the light source.

19. The system of any of clauses 11-18, wherein the display panel includes the light source.

20. The system of any of clauses 11-19, where the electronics layer comprises a first electronic circuit that controls a device included in the ALM interface layer, a first metallic via path through the electronics layer and the photonics IC layer that couples first electronic circuit to the device included in the ALM interface layer, a second electronic circuit that controls a device included in the photonics IC layer, and a second metallic via path through the electronics layer that couples the second electronic circuit to the device included in the photonics IC layer.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. An apparatus comprising:
a composite backplane that modulates light from a light source, comprising:
an electronics layer disposed on a substrate;
a photonics integrated circuit (IC) layer disposed on the electronics layer that causes light from the light source to propagate in a first direction; and
an active light modulation (ALM) interface layer disposed on the photonics IC layer controls an active medium layer in order to control the light propagating in the first direction.

2. The apparatus of claim 1, wherein the ALM interface layer comprises:
a set of electrodes that modulate one or more pixels;
an alignment layer between the set of electrodes; and
at least one of an anti-reflection (AR) or a partial-reflection (PR) coating;
wherein the set of electrodes modulate the light propagating in the first direction by controlling corresponding pixels.

3. The apparatus of claim 2, wherein:
the ALM interface layer further comprises a black matrix layer interspersed between the set of electrodes,
the active medium layer comprises a layer of liquid crystals as an active light modulation medium; and
the alignment layer is disposed on the black matrix layer and the set of electrodes.

4. The apparatus of claim 2, wherein the photonics IC layer comprises:
one or more light-guiding waveguides that receive the light produced by the light source and perform a set of optical operations; and
a set of output couplers that direct the light from the one or more light-guiding waveguides to propagate in the first direction.

5. The apparatus of claim 4, wherein the light source comprises at least one of a light-emitting diode or a laser.

6. The apparatus of claim 4, wherein the photonics IC layer further comprises a light-coupling component that connects the light source with the one or more light-guiding waveguides.

7. The apparatus of claim 4, wherein the photonics IC layer further comprises a set of optical couplers and a set of intensity modulators, wherein the set of optical couplers and the set of intensity modulators direct at least a portion of the light included in a first light-guiding waveguide to a second light-guiding waveguide.

8. The apparatus of claim 1, wherein the electronics layer comprises:
a first electronic circuit that controls a device included in the ALM interface layer;
a first metallic via path through the electronics layer and the photonics IC layer that couples first electronic circuit to the device included in the ALM interface layer;
a second electronic circuit that controls a device included in the photonics IC layer; and
a second metallic via path through the electronics layer that couples the second electronic circuit to the device included in the photonics IC layer.

9. The apparatus of claim 8, wherein:
the electronics layer further comprises at least a set of electronic circuits that are connected to the first electronic circuit or the second electronic circuit via additional via paths, and
the set of electronic circuits process input data and generates a set of one or more control signals for the ALM interface layer or the photonics IC layer.

10. The apparatus of claim 1, further comprising:
an active medium layer disposed on the ALM interface layer comprising sets of active media included in a set of pixels; and
a top cover layer disposed on the active medium layer,
wherein the sets of active media modify at least one property of the light propagating in the first direction; and each pixel in a set of pixels independently modulates a portion of the light propagating in the first direction.

11. A display system comprising:
a display panel comprising:
a composite backplane, including:
an electronics layer disposed on a substrate,
a photonics integrated circuit (IC) layer disposed on the electronics layer that directs light from a light source to propagate in a first direction, and
an active light modulation (ALM) interface layer disposed the photonics IC layer,
an active medium layer disposed on the ALM interface layer comprising sets of pixels including sets of an active media, and
a top cover layer, and
a controller causing the display panel to modify the light controlled via the active medium layer or the photonic IC layer.

12. The system of claim 11, wherein the top cover layer comprises at least one of a photoalignment layer, an electrode layer, or a mechanical supporting layer.

13. The system of claim 11, wherein:
the light source comprises at least one of a light-emitting diode (LED), a laser, a superluminescent LED, or a nonlinear optical source; and
the photonics IC layer further comprises a light-coupling component that connects the light source with the one or more light-guiding waveguides.

14. The system of claim 11, wherein each pixel in the set of pixels independently modulates at least one property of the light propagating in the first direction.

15. The system of claim 14, wherein:
the ALM interface layer includes a set of electrodes that modulate the light propagating in the first direction by controlling the sets of the active media; and
the controller causes the display panel to modify the light by sending control signals to the set of electrodes.

16. The system of claim 11, wherein the photonics IC layer comprises:
one or more light-guiding waveguides that receive the light produced by the light source and perform a set of optical operations; and
a set of output couplers that direct the light from the one or more light-guiding waveguides to propagate in the first direction,
wherein the controller causes the display panel to modify the light by sending control signals to at least one of the one or more light-guiding waveguides or the set of output couplers.

17. The system of claim 11, wherein the display panel performs amplitude modulation on the light provided by the light source.

18. The system of claim 11, wherein the display panel comprises a holographic display that performs phase modulation on the light provided by the light source.

19. The system of claim 11, wherein the display panel includes the light source.

20. The system of claim 11, wherein the electronics layer comprises:
a first electronic circuit that controls a device included in the ALM interface layer;
a first metallic via path through the electronics layer and the photonics IC layer that couples first electronic circuit to the device included in the ALM interface layer;
a second electronic circuit that controls a device included in the photonics IC layer; and
a second metallic via path through the electronics layer that couples the second electronic circuit to the device included in the photonics IC layer.

* * * * *